(12) United States Patent
Beyer, Jr.

(10) Patent No.: US 10,645,562 B2
(45) Date of Patent: *May 5, 2020

(54) METHOD TO PROVIDE AD HOC AND PASSWORD PROTECTED DIGITAL AND VOICE NETWORKS

(71) Applicant: AGIS Software Development LLC, Marshall, TX (US)

(72) Inventor: Malcolm K. Beyer, Jr., Jupiter, FL (US)

(73) Assignee: AGIS Software Development LLC, Marshall, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/435,203

(22) Filed: Jun. 7, 2019

(65) Prior Publication Data
US 2019/0289452 A1  Sep. 19, 2019

Related U.S. Application Data

(63) Continuation of application No. 15/809,102, filed on Nov. 10, 2017, now Pat. No. 10,341,838, which is a
(Continued)

(51) Int. Cl.
*H04W 4/00* (2018.01)
*H04W 4/90* (2018.01)
(Continued)

(52) U.S. Cl.
CPC ............ *H04W 4/90* (2018.02); *G01S 19/17* (2013.01); *G06F 3/0482* (2013.01);
(Continued)

(58) Field of Classification Search
CPC ...... H04W 4/029; H04W 64/00; H04W 4/021
See application file for complete search history.

(56) References Cited

U.S. PATENT DOCUMENTS

| 5,305,370 A | 4/1994 | Kearns et al. |
| 5,325,310 A | 6/1994 | Johnson et al. |

(Continued)

FOREIGN PATENT DOCUMENTS

| CA | 2361225 A1 | 9/2000 |
| DE | 10103236 B4 | 3/2004 |

(Continued)

OTHER PUBLICATIONS

U.S. Appl. No. 15/809,102, Method to Provide Ad Hoc and Password Protected Digital and Voice Networks, filed Nov. 10, 2017.
(Continued)

*Primary Examiner* — Omoniyi Obayanju
(74) *Attorney, Agent, or Firm* — Goodwin Procter LLP

(57) ABSTRACT

A method and system includes the ability for individuals to set up an ad hoc digital and voice network easily and rapidly to allow users to coordinate their activities by eliminating the need for pre-entry of data into a web or identifying others by name, phone numbers or email. This method is especially useful for police, fire fighters, military, first responders or other emergency situations for coordinating different organizations at the scene of a disaster to elevate conventional communication problems either up and down the chain of command or cross communication between different emergency units. The method and system provides that the users are only required to enter a specific Server IP address and an ad hoc event name, a password and perhaps the name of the particular unit.

45 Claims, 7 Drawing Sheets

Related U.S. Application Data continuation of application No. 15/722,660, filed on Oct. 2, 2017, now Pat. No. 10,299,100, which is a continuation of application No. 15/469,469, filed on Mar. 24, 2017, now Pat. No. 10,292,033, which is a continuation of application No. 15/287,638, filed on Oct. 6, 2016, now Pat. No. 9,706,381, which is a continuation of application No. 14/529,978, filed on Oct. 31, 2014, now Pat. No. 9,467,838, which is a continuation-in-part of application No. 14/027,410, filed on Sep. 16, 2013, now Pat. No. 8,880,042, which is a continuation of application No. 13/751,453, filed on Jan. 28, 2013, now Pat. No. 8,538,393, which is a continuation-in-part of application No. 12/761,533, filed on Apr. 16, 2010, now Pat. No. 8,364,129, which is a continuation-in-part of application No. 11/615,472, filed on Dec. 22, 2006, now Pat. No. 8,126,441, which is a continuation-in-part of application No. 11/308,648, filed on Apr. 17, 2006, now Pat. No. 7,630,724, which is a continuation-in-part of application No. 10/711,490, filed on Sep. 21, 2004, now Pat. No. 7,031,728.

(51) Int. Cl.

| | | |
|---|---|---|
| *H04W 76/50* | (2018.01) | |
| *H04W 76/11* | (2018.01) | |
| *H04W 76/15* | (2018.01) | |
| *G01S 19/17* | (2010.01) | |
| *H04M 1/725* | (2006.01) | |
| *H04W 12/06* | (2009.01) | |
| *H04L 29/08* | (2006.01) | |
| *H04L 29/06* | (2006.01) | |
| *H04W 4/02* | (2018.01) | |
| *H04W 68/00* | (2009.01) | |
| *H04W 12/08* | (2009.01) | |
| *H04W 12/02* | (2009.01) | |
| *H04M 3/56* | (2006.01) | |
| *G06F 3/0482* | (2013.01) | |
| *H04W 64/00* | (2009.01) | |
| *H04L 29/12* | (2006.01) | |
| *H04W 4/021* | (2018.01) | |
| *G06F 3/0484* | (2013.01) | |
| *H04M 7/00* | (2006.01) | |
| *H04W 84/18* | (2009.01) | |
| *H04W 4/14* | (2009.01) | |
| *H04W 4/08* | (2009.01) | |
| *H04W 68/04* | (2009.01) | |
| *H04M 1/27475* | (2020.01) | |
| *H04W 4/10* | (2009.01) | |
| *H04W 4/029* | (2018.01) | |
| *H04W 12/04* | (2009.01) | |
| *H04W 84/04* | (2009.01) | |
| *H04W 76/45* | (2018.01) | |

(52) U.S. Cl.
CPC ........ *G06F 3/04842* (2013.01); *H04L 61/605* (2013.01); *H04L 63/065* (2013.01); *H04L 63/083* (2013.01); *H04L 63/104* (2013.01); *H04L 67/18* (2013.01); *H04M 1/27475* (2020.01); *H04M 1/72519* (2013.01); *H04M 1/72536* (2013.01); *H04M 1/72547* (2013.01); *H04M 1/72572* (2013.01); *H04M 1/72583* (2013.01); *H04M 3/56* (2013.01); *H04M 7/006* (2013.01); *H04W 4/021* (2013.01); *H04W 4/023* (2013.01); *H04W 4/026* (2013.01); *H04W 4/027* (2013.01); *H04W 4/08* (2013.01); *H04W 4/14* (2013.01); *H04W 12/02* (2013.01); *H04W 12/06* (2013.01); *H04W 12/08* (2013.01); *H04W 64/00* (2013.01); *H04W 68/00* (2013.01); *H04W 68/04* (2013.01); *H04W 76/11* (2018.02); *H04W 76/15* (2018.02); *H04W 76/50* (2018.02); *H04W 84/18* (2013.01); *H04L 61/2007* (2013.01); *H04M 1/72525* (2013.01); *H04M 2250/10* (2013.01); *H04M 2250/22* (2013.01); *H04M 2250/62* (2013.01); *H04W 4/029* (2018.02); *H04W 4/10* (2013.01); *H04W 12/04* (2013.01); *H04W 76/45* (2018.02); *H04W 84/042* (2013.01)

(56) References Cited

U.S. PATENT DOCUMENTS

| | | |
|---|---|---|
| 5,555,286 A | 9/1996 | Tendler |
| 5,563,931 A | 10/1996 | Bishop et al. |
| 5,692,032 A | 11/1997 | Seppanen |
| 5,742,905 A | 4/1998 | Pepe et al. |
| 5,754,111 A | 5/1998 | Garcia |
| 5,764,898 A | 6/1998 | Tsuji et al. |
| 5,898,434 A | 4/1999 | Small et al. |
| 6,028,514 A | 2/2000 | Lemelson et al. |
| 6,104,704 A | 8/2000 | Buhler et al. |
| 6,108,704 A | 8/2000 | Hutton |
| 6,119,017 A | 9/2000 | Cassidy et al. |
| 6,128,291 A | 10/2000 | Perlman et al. |
| 6,148,332 A | 11/2000 | Brewer |
| 6,182,114 B1 | 1/2001 | Yap et al. |
| 6,204,844 B1 | 3/2001 | Fumarolo et al. |
| 6,232,971 B1 | 5/2001 | Haynes |
| 6,271,835 B1 | 8/2001 | Hoeksma |
| 6,292,687 B1 | 9/2001 | Lowell et al. |
| 6,292,747 B1 | 9/2001 | Amro et al. |
| 6,366,782 B1 | 4/2002 | Fumarolo et al. |
| 6,377,210 B1 | 4/2002 | Moore |
| 6,385,465 B1 | 5/2002 | Yoshioka |
| 6,434,403 B1 | 8/2002 | Ausems et al. |
| 6,459,440 B1 | 10/2002 | Monnes et al. |
| 6,477,387 B1 | 11/2002 | Jackson et al. |
| 6,487,595 B1 | 11/2002 | Turunen et al. |
| 6,490,521 B2 | 12/2002 | Wiener |
| 6,504,503 B1 | 1/2003 | Saint Hilaire et al. |
| 6,518,957 B1 | 2/2003 | Lehtinen et al. |
| 6,542,475 B1 | 4/2003 | Bala et al. |
| 6,549,768 B1 | 4/2003 | Fraccaroli |
| 6,654,683 B2 | 11/2003 | Jin et al. |
| 6,661,353 B1 | 12/2003 | Gopen |
| 6,662,016 B1 | 12/2003 | Buckham et al. |
| 6,665,293 B2 | 12/2003 | Thornton et al. |
| 6,697,734 B1 | 2/2004 | Suomela |
| 6,700,589 B1 | 3/2004 | Canelones et al. |
| 6,704,303 B1 | 3/2004 | Bowman-Amuah |
| 6,716,101 B1 | 4/2004 | Meadows et al. |
| 6,772,142 B1 | 8/2004 | Kelling et al. |
| 6,775,560 B2 | 8/2004 | King et al. |
| 6,816,878 B1 | 11/2004 | Zimmers et al. |
| 6,829,478 B1 | 12/2004 | Layton et al. |
| 6,847,293 B2 | 1/2005 | Menard et al. |
| 6,854,007 B1 | 2/2005 | Hammond |
| 6,867,733 B2 | 3/2005 | Sandhu et al. |
| 6,868,333 B2 | 3/2005 | Melen |
| 6,868,337 B2 | 3/2005 | Muramatsu |
| 6,882,856 B1 | 4/2005 | Alterman et al. |
| 6,885,874 B2 | 4/2005 | Grube et al. |
| 6,941,127 B2 | 9/2005 | Muramatsu |
| 7,002,952 B2 | 2/2006 | Jones |
| 7,024,207 B2 | 4/2006 | Gorday et al. |
| 7,031,700 B1 | 4/2006 | Weaver et al. |
| 7,031,728 B2 | 4/2006 | Beyer, Jr. |
| 7,039,040 B1 | 5/2006 | Burg |
| 7,088,233 B2 | 8/2006 | Menard |
| 7,103,333 B2 | 9/2006 | Lazaridis et al. |

(56) References Cited

U.S. PATENT DOCUMENTS

| | | |
|---|---|---|
| 7,158,878 B2 | 1/2007 | Rasmussen et al. |
| 7,181,192 B2 | 2/2007 | Panasik et al. |
| 7,194,083 B1 | 3/2007 | Tischer et al. |
| 7,212,111 B2 | 5/2007 | Tupler et al. |
| 7,219,303 B2 | 5/2007 | Fish |
| 7,221,928 B2 | 5/2007 | Laird et al. |
| 7,233,781 B2 | 6/2007 | Hunter et al. |
| 7,251,470 B2 | 7/2007 | Faucher et al. |
| 7,261,691 B1 | 8/2007 | Asomani |
| 7,271,742 B2 | 9/2007 | Sheha et al. |
| 7,277,018 B2 | 10/2007 | Reyes et al. |
| 7,292,935 B2 | 11/2007 | Yoon |
| 7,299,075 B2 | 11/2007 | Gottlieb et al. |
| 7,330,112 B1 | 2/2008 | Emigh et al. |
| 7,353,034 B2 | 4/2008 | Haney |
| 7,386,589 B1 | 6/2008 | Tanumihardja et al. |
| 7,398,551 B2 | 7/2008 | Thomas et al. |
| 7,421,270 B2 * | 9/2008 | Serafat .................... H04W 8/22 455/419 |
| 7,426,202 B2 | 9/2008 | Warrier et al. |
| 7,450,003 B2 | 11/2008 | Weber et al. |
| 7,454,233 B2 | 11/2008 | Lu et al. |
| 7,474,627 B2 | 1/2009 | Chheda et al. |
| 7,477,143 B2 | 1/2009 | Albert |
| 7,486,648 B1 | 2/2009 | Baranowski |
| 7,499,799 B2 | 3/2009 | Park |
| 7,574,353 B2 | 8/2009 | Trombetta et al. |
| 7,593,740 B2 | 9/2009 | Crowley et al. |
| 7,609,669 B2 | 10/2009 | Sweeney et al. |
| 7,619,584 B2 | 11/2009 | Wolf |
| 7,630,724 B2 | 12/2009 | Beyer, Jr. et al. |
| 7,633,898 B2 | 12/2009 | Jain et al. |
| 7,650,425 B2 | 1/2010 | Davis et al. |
| 7,664,233 B1 | 2/2010 | Kirchmeier et al. |
| 7,672,681 B1 | 3/2010 | Beyer |
| 7,689,232 B1 | 3/2010 | Beyer |
| 7,764,954 B2 | 7/2010 | Beyer, Jr. |
| 7,801,134 B2 | 9/2010 | Hori et al. |
| 7,801,781 B2 | 9/2010 | Olin et al. |
| 7,805,146 B1 | 9/2010 | Beyer |
| 7,848,765 B2 | 12/2010 | Phillips et al. |
| 7,853,273 B2 | 12/2010 | Beyer |
| 7,912,913 B2 | 3/2011 | Accapadi et al. |
| 7,917,866 B1 | 3/2011 | Karam |
| 8,000,724 B1 | 8/2011 | Rayburn |
| 8,013,732 B2 | 9/2011 | Petite et al. |
| 8,014,763 B2 | 9/2011 | Hymes |
| 8,064,412 B2 | 11/2011 | Petite |
| 8,078,164 B2 | 12/2011 | Ganesan |
| 8,126,441 B2 | 2/2012 | Beyer, Jr. |
| 8,139,514 B2 | 3/2012 | Weber et al. |
| 8,213,970 B2 | 7/2012 | Beyer |
| 8,250,155 B2 | 8/2012 | Corry et al. |
| 8,300,644 B2 | 10/2012 | Gilbert et al. |
| 8,364,129 B1 | 1/2013 | Beyer, Jr. |
| 8,369,843 B2 | 2/2013 | Fux et al. |
| 8,412,147 B2 | 4/2013 | Hunter et al. |
| 8,538,393 B1 | 9/2013 | Beyer, Jr. et al. |
| 8,549,285 B2 | 10/2013 | Fink et al. |
| RE44,716 E | 1/2014 | Vaziri et al. |
| 8,713,302 B1 | 4/2014 | Kirchhoff |
| 8,731,158 B2 | 5/2014 | Donovan |
| 8,781,089 B2 | 7/2014 | Gilboa et al. |
| 8,792,479 B2 | 7/2014 | Bender et al. |
| 8,880,042 B1 | 11/2014 | Beyer, Jr. et al. |
| 8,982,876 B2 | 3/2015 | Kundaje et al. |
| 9,019,946 B1 | 4/2015 | Rao et al. |
| 9,408,055 B2 | 8/2016 | Beyer, Jr. |
| 9,445,251 B2 | 9/2016 | Beyer, Jr. et al. |
| 9,467,838 B2 | 10/2016 | Beyer, Jr. et al. |
| 9,544,271 B2 | 1/2017 | McFarland et al. |
| 9,706,381 B2 | 7/2017 | Beyer, Jr. et al. |
| 9,749,829 B2 | 8/2017 | Beyer, Jr. et al. |
| 9,820,123 B2 | 11/2017 | Beyer, Jr. et al. |
| 10,213,108 B2 | 2/2019 | Al-Ali |
| 2001/0026609 A1 | 10/2001 | Weinstein et al. |
| 2001/0044321 A1 | 11/2001 | Ausems et al. |
| 2002/0027901 A1 | 3/2002 | Liu et al. |
| 2002/0061762 A1 | 5/2002 | Maggenti et al. |
| 2002/0064147 A1 | 5/2002 | Jonas et al. |
| 2002/0115450 A1 | 8/2002 | Muramatsu |
| 2002/0115453 A1 | 8/2002 | Poulin et al. |
| 2002/0135615 A1 | 9/2002 | Lang |
| 2002/0173906 A1 | 11/2002 | Muramatsu |
| 2002/0194378 A1 | 12/2002 | Foti |
| 2003/0013461 A1 | 1/2003 | Mizune et al. |
| 2003/0050040 A1 | 3/2003 | Yamazaki et al. |
| 2003/0081011 A1 | 5/2003 | Sheldon et al. |
| 2003/0093405 A1 | 5/2003 | Mayer |
| 2003/0100326 A1 * | 5/2003 | Grube .................... H04W 84/08 455/515 |
| 2003/0103072 A1 | 6/2003 | Ko |
| 2003/0103088 A1 | 6/2003 | Dresti et al. |
| 2003/0114171 A1 | 6/2003 | Miyamoto |
| 2003/0128195 A1 | 7/2003 | Banerjee et al. |
| 2003/0139150 A1 | 7/2003 | Rodriguez et al. |
| 2003/0149527 A1 | 8/2003 | Sikila |
| 2003/0200259 A1 | 10/2003 | Tsuge |
| 2003/0217109 A1 | 11/2003 | Ordille et al. |
| 2003/0224762 A1 | 12/2003 | Lau et al. |
| 2003/0229441 A1 | 12/2003 | Pechatnikov |
| 2004/0034284 A1 | 2/2004 | Aversano et al. |
| 2004/0054428 A1 * | 3/2004 | Sheha ................ G01C 21/3664 700/56 |
| 2004/0137884 A1 | 7/2004 | Engstrom et al. |
| 2004/0143391 A1 | 7/2004 | King et al. |
| 2004/0148090 A1 * | 7/2004 | Melen .................... G01C 21/26 701/482 |
| 2004/0157590 A1 | 8/2004 | Lazaridis et al. |
| 2004/0192299 A1 | 9/2004 | Wilson et al. |
| 2004/0203568 A1 | 10/2004 | Kirtland |
| 2004/0204070 A1 | 10/2004 | August et al. |
| 2004/0213215 A1 | 10/2004 | Kakiuchi |
| 2004/0243710 A1 | 12/2004 | Mao |
| 2004/0246128 A1 | 12/2004 | Menard |
| 2004/0247090 A1 | 12/2004 | Nurmela |
| 2004/0252050 A1 | 12/2004 | Tengler et al. |
| 2004/0266456 A1 | 12/2004 | Bostrom et al. |
| 2005/0027705 A1 | 2/2005 | Sadri et al. |
| 2005/0030977 A1 | 2/2005 | Casey et al. |
| 2005/0060069 A1 | 3/2005 | Breed et al. |
| 2005/0113123 A1 | 5/2005 | Torvinen |
| 2005/0130634 A1 | 6/2005 | Godfrey |
| 2005/0130666 A1 | 6/2005 | Levy et al. |
| 2005/0151640 A1 | 7/2005 | Hastings |
| 2005/0221876 A1 | 10/2005 | Van Bosch et al. |
| 2005/0227705 A1 | 10/2005 | Rousu et al. |
| 2005/0246419 A1 | 11/2005 | Jaatinen |
| 2005/0265256 A1 | 12/2005 | Delaney |
| 2005/0270311 A1 | 12/2005 | Rasmussen et al. |
| 2006/0015407 A1 | 1/2006 | Bernard et al. |
| 2006/0030339 A1 | 2/2006 | Zhovnirovsky et al. |
| 2006/0031927 A1 | 2/2006 | Mizuno et al. |
| 2006/0034443 A1 * | 2/2006 | Daurensan ............ G01C 21/20 379/218.01 |
| 2006/0035647 A1 | 2/2006 | Eisner et al. |
| 2006/0039353 A1 | 2/2006 | Samuel et al. |
| 2006/0047825 A1 | 3/2006 | Steenstra et al. |
| 2006/0155871 A1 | 7/2006 | Ilkka et al. |
| 2006/0178128 A1 | 8/2006 | Eaton |
| 2006/0218232 A1 | 9/2006 | Kubala et al. |
| 2007/0047707 A1 | 3/2007 | Mayer et al. |
| 2007/0081649 A1 | 4/2007 | Baudino |
| 2007/0150444 A1 | 6/2007 | Chesnais et al. |
| 2007/0153986 A1 | 7/2007 | Bloebaum et al. |
| 2007/0178912 A1 | 8/2007 | Baranowski |
| 2007/0200713 A1 | 8/2007 | Weber et al. |
| 2007/0218885 A1 | 9/2007 | Pfleging et al. |
| 2007/0281689 A1 | 12/2007 | Altman et al. |
| 2007/0281690 A1 | 12/2007 | Altman et al. |
| 2008/0132243 A1 | 6/2008 | Spalink et al. |
| 2008/0219416 A1 | 9/2008 | Roujinsky |
| 2008/0304460 A1 | 12/2008 | Thermond |
| 2010/0052945 A1 | 3/2010 | Breed |

(56) References Cited

U.S. PATENT DOCUMENTS

| | | | |
|---|---|---|---|
| 2010/0125636 | A1 | 5/2010 | Kuhlke et al. |
| 2011/0053554 | A1 | 3/2011 | Wong et al. |
| 2012/0008526 | A1 | 1/2012 | Borghei |
| 2013/0183949 | A1 | 7/2013 | Sulmar |
| 2015/0067055 | A1 | 3/2015 | Khera et al. |
| 2015/0264167 | A1 | 9/2015 | Beyer, Jr. et al. |
| 2015/0319789 | A1 | 11/2015 | Beyer, Jr. et al. |
| 2016/0021522 | A1 | 1/2016 | Beyer, Jr. et al. |
| 2016/0057598 | A1 | 2/2016 | Beyer, Jr. et al. |
| 2017/0026815 | A1 | 1/2017 | Beyer, Jr. et al. |
| 2017/0201621 | A1 | 7/2017 | Beyer, Jr. et al. |
| 2017/0238158 | A1 | 8/2017 | Beyer, Jr. et al. |
| 2018/0027111 | A1 | 1/2018 | Beyer, Jr. et al. |
| 2018/0152556 | A1 | 5/2018 | Beyer, Jr. et al. |

FOREIGN PATENT DOCUMENTS

| | | | |
|---|---|---|---|
| EP | 1148754 | A2 | 10/2001 |
| EP | 1655888 | A1 | 5/2006 |
| EP | 1874021 | A1 | 1/2008 |
| EP | 2348423 | A2 | 7/2011 |
| JP | H04 358448 | A | 12/1992 |
| JP | H05 303335 | A | 11/1993 |
| JP | H08-5394 | A | 1/1996 |
| JP | H09-113288 | A | 5/1997 |
| JP | 2000-357296 | A | 12/2000 |
| JP | 2002077372 | A | 3/2002 |
| JP | 2002-245336 | A | 8/2002 |
| JP | 2002-277256 | A | 9/2002 |
| JP | 2003139546 | A | 5/2003 |
| JP | 2003230172 | A | 8/2003 |
| JP | 2003264861 | | 9/2003 |
| JP | 2007532560 | A | 11/2007 |
| WO | WO-2002/17567 | A2 | 2/2002 |
| WO | WO-200137532 | A3 | 4/2002 |
| WO | WO-2003/071825 | A1 | 8/2003 |
| WO | WO-03/074973 | A2 | 9/2003 |
| WO | WO-2003/096660 | A1 | 11/2003 |
| WO | WO-2008/030702 | A2 | 3/2008 |
| WO | WO-2008027891 | A2 | 3/2008 |
| WO | WO-2008/118878 | A2 | 10/2008 |

OTHER PUBLICATIONS

*AGIS Software Development LLC* v. *Huawei Device USA Inc. et al.* (E.D. Tex.), filed Jun. 21, 2017, U.S. Pat. Nos. 8,213,970, 9,408,055, 9,445,251, 9,467,838, 9,749,829.
*AGIS Software Development LLC* v. *HTC Corporation* (E.D. Tex.), filed Jun. 21, 2017, U.S. Pat. Nos. 8,213,970, 9,408,055, 9,445,251, 9,467,838, 9,749,829.
*AGIS Software Development LLC* v. *LG Electronics, Inc.* (E.D. Tex.), filed Jun. 21, 2017, U.S. Pat. Nos. 8,213,970, 9,408,055, 9,445,251, 9,467,838, 9,749,829.
*AGIS Software Development LLC* v. *Apple Inc.* (E.D. Tex.), filed Jun. 21, 2017, U.S. Pat. Nos. 8,213,970, 9,408,055, 9,445,251, 9,467,838, 9,749,829.
*AGIS Software Development LLC* v. *ZTE Corporation, et al.* (E.D. Tex.), filed Jun. 21, 2017, U.S. Pat. Nos. 8,213,970, 9,408,055, 9,445,251, 9,467,838, 9,749,829.
Petition for Inter Partes Review (USPTO Patent Trial and Appeal Board), Case No. IPR2018-00817, filed Mar. 22, 2018, U.S. Pat. No. 9,445,251.
Petition for Inter Partes Review (USPTO Patent Trial and Appeal Board), Case No. IPR2018-00818, filed Mar. 22, 2018, U.S. Pat. No. 9,408,055.
Petition for Inter Partes Review (USPTO Patent Trial and Appeal Board), Case No. IPR2018-00819, filed Mar. 22, 2018, U.S. Pat. No. 9,467,838.
Petition for Inter Partes Review (USPTO Patent Trial and Appeal Board), Case No. IPR2018-00821, filed Mar. 22, 2018, U.S. Pat. No. 8,213,970.
Petition for Inter Partes Review (USPTO Patent Trial and Appeal Board), Case No. IPR2018-01079, filed May 15, 2018, U.S. Pat. No. 8,213,970.
Petition for Inter Partes Review (USPTO Patent Trial and Appeal Board), Case No. IPR2018-01080, filed May 15, 2018, U.S. Pat. No. 9,408,055.
Petition for Inter Partes Review (USPTO Patent Trial and Appeal Board), Case No. IPR2018-01081, filed May 15, 2018, U.S. Pat. No. 9,445,251.
Petition for Inter Partes Review (USPTO Patent Trial and Appeal Board), Case No. IPR2018-01082, filed May 15, 2018, U.S. Pat. No. 9,445,251.
Petition for Inter Partes Review (USPTO Patent Trial and Appeal Board), Case No. IPR2018-01083, filed May 15, 2018, U.S. Pat. No. 9,445,251.
Petition for Inter Partes Review (USPTO Patent Trial and Appeal Board), Case No. IPR2018-01084, filed May 15, 2018, U.S. Pat. No. 9,445,251.
Petition for Inter Partes Review (USPTO Patent Trial and Appeal Board), Case No. IPR2018-01085, filed May 15, 2018, U.S. Pat. No. 9,467,838.
Petition for Inter Partes Review (USPTO Patent Trial and Appeal Board), Case No. IPR2018-01086, filed May 15, 2018, U.S. Pat. No. 9,467,838.
Petition for Inter Partes Review (USPTO Patent Trial and Appeal Board), Case No. IPR2018-01087, filed May 15, 2018, U.S. Pat. No. 9,467,838.
Petition for Inter Partes Review (USPTO Patent Trial and Appeal Board), Case No. IPR2018-01088, filed May 15, 2018, U.S. Pat. No. 9,467,838.
Petition for Inter Partes Review (USPTO Patent Trial and Appeal Board), Case No. IPR2018-01471, filed Jul. 31, 2018, U.S. Pat. No. 9,749,829.
Petition for Inter Partes Review (U.S. Patent and Trademark Office Patent Trial and Appeal Board), Case No. IPR2019-00389, filed Dec. 7, 2018, U.S. Pat. No. 9,467,838.
Petition for Inter Partes Review (U.S. Patent and Trademark Office Patent Trial and Appeal Board), Case No. IPR2019-00403, filed Dec. 7, 2018, U.S. Pat. No. 9,467,838.
Petition for Inter Partes Review (U.S. Patent and Trademark Office Patent Trial and Appeal Board), Case No. IPR2019-00411, filed Dec. 7, 2018, U.S. Pat. No. 8,213,970.
Petition for Inter Partes Review (U.S. Patent and Trademark Office Patent Trial and Appeal Board), Case No. IPR2019-00432, filed Dec. 13, 2018, U.S. Pat. No. 9,408,055.
Petition for Inter Partes Review (U.S. Patent and Trademark Office Patent Trial and Appeal Board), Case No. IPR2019-00485, filed Dec. 20, 2018, U.S. Pat. No. 8,213,970.
Petition for Inter Partes Review (U.S. Patent and Trademark Office Patent Trial and Appeal Board), Case No. IPR2019-00487, filed Jan. 4, 2019, U.S. Pat. No. 9,408,055.
Petition for Inter Partes Review (U.S. Patent and Trademark Office Patent Trial and Appeal Board), Case No. IPR2019-00523, filed Jan. 3, 2019, U.S. Pat. No. 9,445,251.
Petition for Inter Partes Review (U.S. Patent and Trademark Office Patent Trial and Appeal Board), Case No. IPR2019-00524, filed Jan. 3, 2019, U.S. Pat. No. 9,445,251.
"911 and E911 Services," Federal Communications Commission, updated Mar. 1, 2018, available at https://www.fcc.gov/general/9-1-1-and-e9-1-1-services (last visited May 7, 2018) (6 pages).
"AGIS Introduces Landmark Mobile Networking," dated Jun. 18, 2007, available as of Aug. 7, 2007 according to Wayback Machine Internet Archive Record, obtained from: https://web.archive.org/web/20070807202449/http://www.agisinc.com/AGIS_announcement.pdf (3 pages).
"AGIS Mobile Communication & Collaboration Software Being Used by Naval Coastal Warfare Squadron," available as of Aug. 7, 2007 according to Wayback Machine Internet Archive Record, obtained from: https://web.archive.org/web/20070807202431/http://www.agisinc.com/AGIS_US_Navy_photofeature.pdf (2 pages).
"BuddySpace Downloads," dated May 1, 2007, publication date unknown, available at: http://projects.kmi.open.ac.uk/buddyspace/downloads/downloads.html (3 pages).

(56) References Cited

OTHER PUBLICATIONS

"Cellular Mobile Pricing Structures and Trends," Organisation for Economic Co-operation and Development, Working Party on Telecommunications and Information Service Policies, May 16, 2000 (103 pages).
"Email," Wikipedia, https://en.wikipedia.org/wiki/Email (last visited May 10, 2018) (19 pages).
"Fact Sheet: FCC Wireless 911 Requirements," Federal Communications Commission, Jan. 2001, available at https://transition.fcc.gov/pshs/services/911-services/enhanced911/archives/factsheet_requirements_012001.pdf (4 pages).
"Force XXI Battle Command, Brigade and Below (FBCB2)," available as of Feb. 4, 2017 according to Wayback Machine Internet Archive Record, obtained from: https://web.archive.org/web/20170204113146/http://www.dote.osd.mil/pub/reports/FY1999/pdf/army/99fbcb2.pdf (4 pages).
"Frequently Asked Questions," BuddySpace.org, available as of Apr. 23, 2007 according to Wayback Machine Internet Archive Record, obtained from: https://web.archive.org/web/20070423184018/http://kmi.open.ac.uk:80/projects/buddyspace/faq.html (11 pages).
"Frequently Asked Questions," BuddySpace.org, available as of Feb. 3, 2004 according to Wayback Machine Internet Archive Record, obtained from: https://web.archive.org/web/20040204032758/http://kmi.open.ac.uk:80/projects/buddyspace/faq.html (4 pages).
"History of Mobile Phones," Wikipedia, https://en.wikipedia.org/wiki/History_of_Mobile_phones (last visited May 10, 2018) (14 pages).
"How It Works: The Navizon Wireless Positioning System," Navizon.com, available as of Feb. 19, 2006 according to Wayback Machine Internet Archive Record, obtained from: https://web.archive.org/web/20060219075647/http://www.navizon.com:80/FullFeatures.htm (8 pages).
"Introduction & Philosophy: Presence in a Nutshell," publication date unknown, available at: http://projects.kmi.open.ac.uk/buddyspace/intro-philosophy.html (3 pages).
"mMode Features: Find Friends," AT&T Wireless, available as of Jun. 18, 2003 according to Wayback Machine Internet Archive Record, obtained from: https://web.archive.org/20030618175223/http://www.attwireless.com:80/mmode/features/findit/FindFriends/ (2 pages).
"Navizon: The first Peer-to-Peer Wireless Positioning System that successfully blends GPS +WiFi + Celluar signals together into one accurate and powerful Mobile Geo-Location System," Navizon.com, available as of Dec. 18, 2005 according to Wayback Machine Internet Archive Record, obtained from: https://web.archive.org/web/20051218105454/http://www.navizon.com:80/index.htm (2 pages).
"Palm VII," Wikipedia, https://en.wikipedia.org/wiki/Palm_VII (last visited May 10, 2018) (2 pages).
"Simon Says 'Here's How!' Simon Mobile Communications Made Simple," Simon Users Manual, IBM Corp., copyright 1994 (41 pages).
"UCSD ActiveCampus," available as of Feb. 6, 2003 according to Wayback Machine Internet Archive Record, obtained from: https://web.archive.org/20030206012106/http://activecampus.ucsd.edu/ (3 pages).
"USCD Active Campus," available as of Aug. 29, 2004 according to Wayback Machine Internet Archive Record, obtained from: https://web.archive.org/web/20040829191734/http://activecampus.ucsd.edu/ (3 pages).
"Voice Over Internet Protocol (VoIP)," Federal Communications Commission, publication date unknown, updated at least as recently as May 13, 2009, available at https://www.fcc.gov/general/voice-over-internet-protocol-voip (last visited May 10, 2018) (11 pages).
Active Campus, "ActiveCampus—Sustaining Educational Communities through Mobile Technology," copyright 2002, available as of Nov. 25, 2004 according to Wayback Machine Internet Archive Record, obtained from: https://web.archive.org/web/20041125060305/http://activecampus.edu:80/slides/active-campus-hpl (35 pages).
Active Campus, "New Features in Active Campus (Apr. 2003)," available as of Sep. 1, 2006 according to Wayback Machine Internet Archive Record, obtained from: https://web.archive.org/web/20060901101253/https://activecampus.ucsd.edu/new-features.php (3 pages).
AGIS, "AGIS First Responders, Mobile Online Group Collaboration," available as of Jul. 10, 2007 according to Wayback Machine Internet Archive Record, obtained from: https://web.archive.org/web/20070710230256/http://www.agisinc.com/FirstResponders.asp (2 pages).
AGIS, "Frequently Asked Questions About AGIS," available as of Jul. 10, 2007 according to Wayback Machine Internet Archive Record, obtained from: https://web.archive.org/web/20070710224856/http://www.agisinc.com/Faq.asp (3 pages).
AGIS, "Mobile Social Networking," available as of Jul. 10, 2007 according to Wayback Machine Internet Archive Record, obtained from: http://web.archive.org/web/20070710224939/http://www.agisinc.com/Social Networking.asp (1 page).
Agis, "Track and Collaborate with Your Entire Team," available as of Jul. 10, 2007 according to Wayback Machine Internet Archive Record, obtained from: http://web.archive.org/web/20070710225045/http://www.agisinc.com/Business.asp (2 pages).
Appendix 1 to P.R. 4-3—Joint Claim Construction and Prehearing Statement—Parties' Proposed Constructions and Supporting Evidence, filed in *AGIS Software Development LLC* v. *Huawei Device USA, Inc.* on Jun. 15, 2018 (131 pages).
Appendix 1 to P.R. 4-3—Updated Joint Claim Construction and Prehearing Statement—Parties' Proposed Constructions and Supporting Evidence, filed in *AGIS Software Development LLC* v. *Huawei Device USA, Inc.* on Jul. 23, 2018 (125 pages).
Appendix A: Comparison of Method and "Device" Claims; Attachment #24 to Defendants' Responsive Claim Construction Brief, filed in *AGIS Software Development LLC* v. *Huawei Device USA, Inc. et al.* (E.D. Texas), Document 175-24 in Case 2:17-cv-513, Aug. 14, 2018 (7 pages).
Appendix A: Joint Claim Construction Chart; Attachment #1 to Joint Claim Construction Chart Pursuant to P.R. 4-5(D), filed in *AGIS Software Development LLC* v. *Huawei Device USA, Inc. et al.* (E.D. Texas), Document 194 in Case 2:17-cv-513, Aug. 27, 2018 (118 pages).
Appendix B: Comparison of '838 Patent Disclosures and Similar Disclosures in '728 Patent; Attachment #25 to Defendants' Responsive Claim Construction Brief, filed in *AGIS Software Development LLC* v. *Huawei Device USA, Inc. et al.* (E.D. Texas), Document 175-25 in Case 2:17-cv-513, Aug. 14, 2018 (3 pages).
Apple Computer, Inc. Macintosh Human Interface Guidelines, 1992 (410 pages); Exhibit 1009 in IPR2018-00821 (*Apple Inc.* v. *AGIS Software Development LLC*; U.S. Pat. No. 8,213,970).
Apple Inc.'s Final Election of Prior Art References, *AGIS Software Development LLC* v. *Apple Inc.* (E.D. Texas), 2:17-cv-513, Aug. 29, 2018 (15 pages).
Apple Newton, Wikipedia, https://en.wikipedia.org/wiki/Apple_Newton (last visited May 10, 2018) (10 pages).
Apple's Answer to AGIS's Original Complaint for Patent Infringement, filed in *AGIS Software Development LLC* v. *Apple Inc.* (E.D. Texas), Document 20 in Case 2:17-cv-516, Aug. 28, 2017 (14 pages).
Apple's Answer to Plaintiff's First Amended Complaint for Patent Infringement, filed in *AGIS Software Development LLC* v. *Apple Inc.* (E.D. Texas), Document 36 in Case 2:17-cv-516, Oct. 2, 2017 (16 pages).
Apple's First Amended Answer to Plaintiff's First Amended Complaint for Patent Infringement, filed in *AGIS Software Development LLC* v. *Huawei Device USA Inc. et al.* (E.D. Texas), Document 148 in Case 2:17-cv-513, Jun. 15, 2018 (23 pages).
APRS Working Group. "Automatic Position Reporting System: APRS Protocol Reference, Protocol Version 1.0," Aug. 29, 2000, available at: http://studylib.net/doc/18674143/aprs-protocol-specification (128 pages).
Baard, M. "A Connection in Every Spot," Wired News, Oct. 16, 2003, available at: https://web.archive.org/web/20031127042047/http://www.wired.com:80/news/print/0,1294,60831,00.html (3 pages).
Bachler, M. et al. "Collaboration in the Semantic Grid: a Basis for e-Learning," publication date unknown, available at: http://oro.open.ac.uk/6202/1/aai_coakting-2005-preprint-krp.pdf (19 pages).

(56) References Cited

OTHER PUBLICATIONS

Ball, D. et al. How to Do Everything with Your Treo 600, 2004 (pp. 25-30); Exhibit 1019 in IPR2018-00821.
Batayneh, Fand A., Location Management in Wireless Data Networks. Apr. 21, 2006, 24pgs. Available on the Internet at https://www.cse.wustl.edu/~jain/cse574-06/ftp/wireless_location/index.html.
Batista, E., "Your Boss May Know Where You Are," Wired News, May 31, 2002; 2pgs.
Bederson, Benjamin B. Fisheye Menus. Proceedings of the ACM Symposium on User Interface Software and Technology, 2000 (pp. 217-225); Exhibit 1015 in IPR2018-00821.
Benefon ESC! GSM + GPS Personal Navigation Phone, 1999, Benefon Oyj, Salo, Finland; 4pgs.
Bruninga, B. "APRS SPEC Addendum 1.1," publication date unknown, available at: http://www.aprs.org/aprs11.html (4 pages).
Bruninga, B. "APRS Tiny Web Pages," Sep. 2000, available at: http://aprs.org/TWP.html (7 pages).
Bruninga, B. "Automatic Packet/Position Reporting System (APRS)," dated Sep. 18, 2002, available at: http://aprs.org/APRS-docs/APRS.TXT (6 pages).
Bruninga, B. "Cellular Automatic Position Reporting System (APRS)", dated Jul. 7, 1999, available as of Jul. 25, 2004 according to Wayback Machine Internet Archive Record, obtained from: https://web.archive.org/web/20040725024219/http://web.usna.navy.mil:80/~bruninga/APRS-docs/CELLULAR.TXT (1 page).
Bruninga, B. "Generic Callsigns for National APRS Events," dated Oct. 20, 2005, available at: http://aprs.org/aprs-jota.txt (1 page).
Bruninga, B. "Potential APRS Map of JOTA Contacts," publication date unknown, obtained from: http://www.aprs.org/cgsrvr.html (last visited Nov. 28, 2017) (4 pages).
Bruninga, B. "Tips for Mobile APRS Users," dated Jan. 2, 2004, available as of Jul. 25, 2004 according to Wayback Machine Internet Archive Record, obtained from: https://web.archive.org/web/20040725035443/http://web.usna.navy.mil:80/~bruninga/APRS-docs/MOBILE.TXT (4 Pages).
Bruninga, B. "Touch Screen Display mods in APRStch.EXE," dated Apr. 17, 2000, available as of Jul. 25, 2004 according to Wayback Machine Internet Archive Record, obtained from: https://web.archive.org/web/20040725034727/http:web.usna.navy.mil:80/~bruninga/APRS-docs/TOUCH.TXT (2 pages).
Carter, J. "Build an APRS Encoder Tracker," QST, Feb. 2002 (5 pages).
Charny, B. "Find a Wireless Friend—for a fee," Cnet, Jun. 24, 2002, available at: https://www.cnet.com/news/find-a-wireless-friend-for-a-fee/ (2 pages).
Charny, B. "New cell feature helps find friends," Cnet, Jun. 25, 2002, available at: https://www.cnet.com/news/new-cell-feaure-helps-find-friends/ (5 pages).
Chen, Ching-Chen et al. "Automatically and Accurately Conflating Satellite Imagery and Maps," In Proceedings of the International Workshop on Next Generation Geospatial Information, Oct. 2003 (4 pages).
Christie, Jock et al. "Development and Deployment of GPS Wireless Devices for E911 and Location Based Services," Position, Location and Navigation Symposium, Palm Springs California, Apr. 15-18, 2002 (6 pages).
Claim Construction Hearing Before the Honorable Chief Judge Rodney Gilstrap (United States District Judge), *AGIS Software Development LLC v. Huawei Device USA Inc. et al.* (E.D. Texas), 2:17-cv-513, Sep. 13, 2018 (109 pages).
Claim Construction Memorandum and Order, issued in *AGIS Software Development LLC v. Huawei Device USA Inc. et al.* (E.D. Texas), Document 205 in Case 2:17-cv-513, Oct. 10, 2018; also Exhibit 1041 in IPR2018-01080 (60 pages).
Claim Construction Order, filed in *AGIS Software Development LLC v. HTC Corp. et al.* (E.D. Texas), Document 93 in Case 2:17-cv-514, Dec. 18, 2018 (2 pages).

Claim Construction Order, issued in *Automated Packaging Systems, Inc. v. Free Flow Packaging International, Inc.* (N.D. Cal.), Document 217 in Case 3:18-cv-356, Aug. 2, 2018 (44 pages); Exhibit 1025 in IPR2018-00817.
Cohen, Deborah. "Digital note-passing gains respect among adults," USAToday.com, Nov. 26, 2004, available at: https://usatoday30.usatoday.com/tech/products/services/2004-11-26-im-gains-cred_x.htm (2 pages).
Conatser, J. et al. "Force XXI Battle Command Brigade and Below-Blue Force Tracking (FBCB2-BFT). A Case Study in the Accelerated Acquisition of a Digital Command and Control System during Operations Enduring Freedom and Iraqi Freedom," dated Dec. 2005, available at www.dtic.mil/dtic/tr/fulltext/u2/a443273.pdf (73 pages).
Corrected Petition for Inter Partes Review of U.S. Pat. No. 9,467,838, IPR2018-01087 (*Google LLC v. AGIS Software Development LLC*; U.S. Pat. No. 9,467,838), Oct. 31, 2018 (76 pages).
Corrected Petition for Inter Partes Review of U.S. Pat. No. 9,467,838, IPR2018-01088 (*Google LLC v. AGIS Software Development LLC*; U.S. Pat. No. 9,467,838), Oct. 31, 2018 (83 pages).
*Curriculum Vitae* of William Griswold, available at: https://cseweb.ucsd.edu/~wgg/CV.pdf (29 pages).
Decision Denying Institution of Inter Partes Review, IPR2018-00817 (*Apple Inc. v. AGIS Software Development LLC*; U.S. Pat. No. 9,445,251), Oct. 3, 2018 (34 pages).
Decision Denying Institution of Inter Partes Review, IPR2018-00818 (*Apple Inc. v. AGIS Software Development LLC*; U.S. Pat. No. 9,408,055), Oct. 3, 2018 (33 pages).
Decision Denying Institution of Inter Partes Review, IPR2018-00821 (*Apple Inc. v. AGIS Software Development LLC*; U.S. Pat. No. 8,213,970), Oct. 23, 2018 (35 pages).
Decision Denying Institution of Inter Partes Review, IPR2018-01081 (*Google LLC v. AGIS Software Development LLC*; U.S. Pat. No. 9,445,251), Nov. 20, 2018 (38 pages).
Decision Denying Institution of Inter Partes Review, IPR2018-01082 (*Google LLC v. AGIS Software Development LLC*; U.S. Pat. No. 9,445,251), Nov. 20, 2018 (39 pages).
Decision Denying Institution of Inter Partes Review, IPR2018-01083 (*Google LLC v. AGIS Software Development LLC*; U.S. Pat. No. 9,445,251), Jan. 10, 2019 (29 pages).
Decision Denying Institution of Inter Partes Review, IPR2018-01084 (*Google LLC v. AGIS Software Development LLC*; U.S. Pat. No. 9,445,251), Jan. 9, 2019 (27 pages).
Decision Denying Institution of Inter Partes Review, IPR2018-01085 (*Google LLC v. AGIS Software Development LLC*; U.S. Pat. No. 9,467,838), Nov. 19, 2018 (22 pages).
Decision Denying Institution of Inter Partes Review, IPR2018-01086 (*Google LLC v. AGIS Software Development LLC*; U.S. Pat. No. 9,467,838), Dec. 4, 2018 (23 pages).
Decision Denying Institution of Inter Partes Review, IPR2018-01087 (*Google LLC v. AGIS Software Development LLC*; U.S. Pat. No. 9,467,838), Jan. 9, 2019 (28 pages).
Decision Denying Institution of Inter Partes Review, IPR2018-01088 (*Google LLC v. AGIS Software Development LLC*; U.S. Pat. No. 9,467,838), Dec. 10, 2018 (30 pages).
Decision Instituting Inter Partes Review, IPR2018-01080 (*Google LLC v. AGIS Software Development LLC*; U.S. Pat. No. 9,408,055), Dec. 4, 2018 (38 pages).
Decision: Institution of Inter Partes Review, IPR2018-00819 (*Apple Inc. v. AGIS Software Development LLC*; U.S. Pat. No. 9,467,838), Nov. 7, 2018 (38 pages).
Decision: Institution of Inter Partes Review, IPR2018-01079 (*Google LLC v. AGIS Software Development LLC*; U.S. Pat. No. 8,213,970), Nov. 20, 2018 (38 pages).
Decision: Institution of Inter Partes Review, IPR2018-01471 (*Apple Inc. v. AGIS Software Development LLC*; U.S. Pat. No. 9,749,829), Feb. 27, 2019 (29 pages).
Declaration of Chris G. Bartone, Ph.D., P.E. in Support of Defendants Huawei Device USA Inc. et al.'s Responsive Claim Construction Brief; Attachment #23 to Defendants' Responsive Claim Construction Brief, filed in *AGIS Software Development LLC v. Huawei Device USA Inc. et al.* (E.D. Texas), Document 175-23 in Case 2:17-cv-513, Aug. 14, 2018 (105 pages).

(56) References Cited

OTHER PUBLICATIONS

Declaration of David Hilliard Williams in Support of Petition for Inter Partes Review of U.S. Pat. No. 8,213,970; Exhibit J to Plaintiff AGIS Software Development LLC's Opening Claim Construction Brief, filed in *AGIS Software Development LLC* v. *Huawei Device USA Inc. et al.* (E.D. Texas), Case 2:17-cv-513, Jul. 26, 2018 (124 pages).
Declaration of David Hilliard Williams in Support of Petition for Inter Partes Review of U.S. Pat. No. 9,408,055; Exhibit 1003 in IPR2018-01080 (*Google LLC* v. *AGIS Software Development LLC*; U.S. Pat. No. 9,408,055), May 15, 2018 (138 pages).
Declaration of David Hilliard Williams in Support of Petition for Inter Partes Review of U.S. Pat. No. 9,445,251; Exhibit 1003 in IPR2018-01081 (*Google LLC* v. *AGIS Software Development LLC*; U.S. Pat. No. 9,445,251), May 15, 2018 (93 pages).
Declaration of David Hilliard Williams in Support of Petition for Inter Partes Review of U.S. Pat. No. 9,445,251; Exhibit 1003 in IPR2018-01082 (*Google LLC* v. *AGIS Software Development LLC*; U.S. Pat. No. 9,445,251), May 15, 2018 (102 pages).
Declaration of David Hilliard Williams in Support of Petition for Inter Partes Review of U.S. Pat. No. 9,445,251; Exhibit 1003 in IPR2018-01083 (*Google LLC* v. *AGIS Software Development LLC*; U.S. Pat. No. 9,445,251), May 15, 2018 (105 pages).
Declaration of David Hilliard Williams in Support of Petition for Inter Partes Review of U.S. Pat. No. 9,445,251; Exhibit 1003 in IPR2018-01084 (*Google LLC* v. *AGIS Software Development LLC*; U.S. Pat. No. 9,445,251), May 15, 2018 (116 pages).
Declaration of David Hilliard Williams in Support of Petition for Inter Partes Review of U.S. Pat. No. 9,467,838; Exhibit 1003 in IPR2018-01085 (*Google LLC* v. *AGIS Software Development LLC*; U.S. Pat. No. 9,467,838), May 15, 2018 (102 pages).
Declaration of David Hilliard Williams in Support of Petition for Inter Partes Review of U.S. Pat. No. 9,467,838; Exhibit 1003 in IPR2018-01086 (*Google LLC* v. *AGIS Software Development LLC*; U.S. Pat. No. 9,467,838), May 15, 2018 (111 pages).
Declaration of David Hilliard Williams in Support of Petition for Inter Partes Review of U.S. Pat. No. 9,467,838; Exhibit 1003 in IPR2018-01087 (*Google LLC* v. *AGIS Software Development LLC*; U.S. Pat. No. 9,467,838), May 15, 2018 (106 pages).
Declaration of David Hilliard Williams in Support of Petition for Inter Partes Review of U.S. Pat. No. 9,467,838; Exhibit 1003 in IPR2018-01088 (*Google LLC* v. *AGIS Software Development LLC*; U.S. Pat. No. 9,467,838), May 15, 2018 (125 pages).
Declaration of Dr. Benjamin B. Bederson in Support of Petition for Inter Partes Review of U.S. Pat. No. 9,408,055, Exhibit 1002 in IPR2018-00818 (*Apple Inc.* v. *AGIS Software Development LLC*; U.S. Pat. No. 9,408,055), Mar. 22, 2018 (115 pages).
Declaration of Dr. Benjamin B. Bederson in Support of Petition for Inter Partes Review of U.S. Pat. No. 9,445,251, Exhibit 1002 in IPR2018-00817 (*Apple Inc.* v. *AGIS Software Development LLC*; U.S. Pat. No. 9,445,251), Mar. 22, 2018 (153 pages).
Declaration of Dr. Benjamin B. Bederson in Support of Petition for Inter Partes Review of U.S. Pat. No. 9,467,838, Exhibit 1002 in IPR2018-00819 (*Apple Inc.* v. *AGIS Software Development LLC*; U.S. Pat. No. 9,467,838), Mar. 22, 2018 (186 pages).
Declaration of Dr. Benjamin B. Bederson in Support of Petition for Inter Partes Review of U.S. Pat. No. 9,749,829, Exhibit 1002 in IPR2018-01471 (*Apple Inc.* v. *AGIS Software Development LLC*; U.S. Pat. No. 9,749,829), Jul. 31, 2018 (114 pages).
Declaration of Dr. Benjamin Bederson in Support of Petition for Inter Partes Review of U.S. Pat. No. 8,213,970; Exhibit I to Plaintiff AGIS Software Development LLC's Opening Claim Construction Brief, filed in *AGIS Software Development LLC* v. *Huawei Device USA Inc. et al.* (E.D. Texas), Case 2:17-cv-513, Jul. 26, 2018 (148 pages).
Declaration of Dr. Jaime G. Carbonell in Support of Plaintiff's Opening Claim Construction Brief; Exhibit H to Plaintiff AGIS Software Development LLC's Opening Claim Construction Brief, filed in *AGIS Software Development LLC* v. *Huawei Device USA Inc. et al.* (E.D. Texas), Document 165-10 in Case 2:17-cv-513, Jul. 26, 2018 (43 pages).
Declaration of Kerri-Ann Limbeed in Support of Defendants' Responsive Claim Construction Brief; Attachment #1 to Defendants' Responsive Claim Construction Brief, filed in *AGIS Software Development LLC* v. *Huawei Device USA Inc. et al.* (E.D. Texas), Document 175-1 in Case 2:17-cv-513, Aug. 14, 2018 (4 pages).
Defendant Apple's Amended Patent Rule 3-3 Invalidity Contentions, *AGIS Software Development LLC* v. *Huawei Device USA Inc. et al.* (E.D. Texas), 2:17-cv-513, Apr. 16, 2018 (49 pages).
Defendant LG Electronics Inc.'s Answer to Plaintiff's Complaint for Patent Infringement, filed in *AGIS Software Development LLC* v. *LG Electronics, Inc.* (E.D. Texas), Document 83 in Case 2:17-cv-514, Oct. 12, 2018 (22 pages).
Defendant's Disclosure Pursuant to Patent Local Rule 4-2 of Preliminary Claim Constructions and Extrinsic Evidence, filed in *AGIS Software Development LLC* v. *Huawei Device USA Inc. et al.* (E.D. Texas), May 18, 2018 (27 pages).
Defendants Huawei Device USA Inc. et al.'s Answer to Plaintiff's First Amended Complaint for Patent Infringement, filed in *AGIS Software Development LLC* v. *Huawei Device USA Inc. et al.* (E.D. Texas), Document 29 in Case 2:17-cv-513, Oct. 5, 2017 (20 pages).
Defendants Huawei Device USA Inc. et al.'s Preliminary Election of Prior Art References, *AGIS Software Development LLC* v. *Huawei Device USA Inc. et al.* (E.D. Texas), 2:17-cv-513, Apr. 30, 2018 (7 pages).
Defendants' Disclosure Pursuant to Patent Local Rule 4-1 of Proposed Terms and Claim Elements for Construction, filed in *AGIS Software Development LLC* v. *Huawei Device USA Inc. et al.* (E.D. Texas), Apr. 27, 2018 (16 pages).
Defendants' Responsive Claim Construction Brief, filed in *AGIS Software Development LLC* v. *Huawei Device USA Inc. et al.* (E.D. Texas), Document 175 in Case 2:17-cv-513, Aug. 14, 2018 (56 pages).
Definition of "Subnetting," Techopedia, available at https://www.techopedia.com/definition/28328/subnetting as of May 10, 2018 (2 pages).
DIGI, Remote Cellular TCP/IP to Rockwell Ethernet and Serial Devices. 37pgs.
Dunn, R.J. III. "Blue Force Tracking: The Afghanistan and Iraq Experience and Its Implications for the U.S. Army," Northrop Grumman, 2003, available at: http://www.northropgrumman.com/AboutUs/AnalysisCenter/Documents/pdfs/BFT-Afghanistan-and-Iraq-Exper.pdf (20 pages).
Durso, Fred. "A Decade of Difference," NFPA Journal, Sep. 1, 2011, available at https://www.nfpa.org/News-and-Research/Publications/NFPA-Journal/2011/September-October-2011/Features/A-Decade-of-Difference (6 pages).
Edlund, T. and Ciber, S., "Mobile Services for Truck Drivers," Master Thesis in Mobile Informatics, IT University of Goleborg, Sweden; 2003; 50pgs.
Eisenstadt, M. et al. "BuddySpace: Enhanced Presence Management for Collaborative Learning, Working, Gaming and Beyond," submitted to JabberCon Europe 2002, publication date unknown, available at: https://pdfs.semanticscholar.org/8f3d/d07b4e9f3095b949e78de9a2be439e98e663.pdf (6 pages).
Exhibit 1009 in IPR2018-01081 ("Microsoft Word document compare of specifications between U.S. Pat. No. 7,630,724 to Beyer, Jr. et al. and U.S. Pat. No. 7,031,728 to Beyer, Jr. et al."), May 15, 2018 (33 pages)10.
Exhibit 1010 ("Computer-generated document comparison showing differences in U.S. Appl. No. 11/711,490 and U.S. Appl. No. 11/308,648") in IPR2018-00817, Mar. 22, 2018 (94 pages).
Exhibit 1011 ("Computer-generated document comparison showing differences in U.S. Appl. No. 11/308,648 and U.S. Appl. No. 11/615,472") in IPR2018-00817, Mar. 22, 2018 (122 pages).
Exhibit 1012 ("Computer-generated document comparison showing differences in U.S. Appl. No. 11/615,472 and U.S. Appl. No. 12/761,533") in IPR2018-00817, Mar. 22, 2018 (94 pages).
Exhibit 1017 ("Computer-generated document comparison showing differences in U.S. Appl. No. 14/027,410 and U.S. Appl. No. 11/308,648") in IPR2018-00817, Mar. 22, 2018 (117 pages).

(56) References Cited

OTHER PUBLICATIONS

Exhibit 1020 in IPR2018-00821 ("Redline comparison between the specifications of U.S. Appl. No. 11/612,830 and U.S. Pat. No. 8,213,970"), Mar. 22, 2018 (90 pages).

Exhibit 1031 in IPR2018-01087 (*Google LLC* v. *AGIS Software Development LLC*; U.S. Pat. No. 9,467,838), Transcript of teleconference between Board and Parties, Oct. 26, 2018 (22 pages).

Exhibit 1032 in IPR2018-01087 (*Google LLC* v. *AGIS Software Development LLC*; U.S. Pat. No. 9,467,838), Document showing differences between Petition and Corrected Petition in redline, Oct. 31, 2018 (77 pages).

Exhibit 1032 in IPR2018-01088 (*Google LLC* v. *AGIS Software Development LLC*; U.S. Pat. No. 9,467,838), Document showing differences between Petition and Corrected Petition in redline, Oct. 31, 2018 (84 pages).

Exhibit 3001 in IPR2018-01471 (*Apple Inc.* v. *AGIS Software Development LLC*; U.S. Pat. No. 9,749,829), PTAB Conference Call, Dec. 18, 2018 (26 pages).

Exhibit A for U.S. Pat. No. 8,213,970 Against Apple Accused Products; Attachment to Plaintiff's Preliminary Infringement Contentions in *AGIS Software Development LLC* v. *Apple, Inc.* (E.D. Texas), Case 2:17-cv-516, also Exhibit 1008 in IPR2018-00821, Mar. 22, 2018 (39 pages).

Exhibit A for U.S. Pat. No. 8,213,970 Against HTC Accused Products; Attachment to Plaintiff's Disclosure of Asserted Claims and Infringement Contentions in *AGIS Software Development LLC* v. *HTC Corp.* (E.D. Texas), 2:17-cv-514, Jan. 19, 2018 (42 pages).

Exhibit A for U.S. Pat. No. 8,213,970 Against Huawei Accused Products; Attachment to Plaintiff's Disclosure of Asserted Claims and Infringement Contentions in *AGIS Software Development LLC* v. *Huawei Device USA Inc. et al.* (E.D. Texas), Case 2:17-cv-513, Nov. 28, 2017 (36 pages).

Exhibit A for U.S. Pat. No. 8,213,970 Against LG Accused Products; Attachment to Plaintiff's Disclosure of Asserted Claims and Infringement Contentions in *AGIS Software Development LLC* v. *LG Electronics, Inc.* (E.D. Texas), 2:17-cv-515, Nov. 28, 2017 (36 pages).

Exhibit A for U.S. Pat. No. 8,213,970 Against ZTE Accused Products; Attachment to Plaintiff's Disclosure of Asserted Claims and Infringement Contentions in *AGIS Software Development LLC* v. *ZTE Corp et al.* (E.D. Texas), 2:17-cv-517, Jan. 19, 2018 (41 pages).

Exhibit B for U.S. Pat. No. 9,408,055 Against HTC Accused Products; Attachment to Plaintiff's Disclosure of Asserted Claims and Infringement Contentions in *AGIS Software Development LLC* v. *HTC Corp.* (E.D. Texas), 2:17-cv-514, Jan. 19, 2018 (979 pages).

Exhibit B for U.S. Pat. No. 9,408,055 Against Huawei Accused Products; Attachment to Plaintiff's Infringement Contentions in *AGIS Software Development LLC* v. *Huawei Device USA Inc., et al.* (E.D. Texas), Case 2:17-cv-513; also Exhibit 1010 in IPR2018-01080, May 15, 2018 (889 pages).

Exhibit B for U.S. Pat. No. 9,408,055 Against LG Accused Products; Attachment to Plaintiff's Disclosure of Asserted Claims and Infringement Contentions in *AGIS Software Development LLC* v. *LG Electronics, Inc.* (E.D. Texas), 2:17-cv-515, Nov. 28, 2017 (902 pages).

Exhibit B for U.S. Pat. No. 9,408,055 Against ZTE Accused Products; Attachment to Plaintiff's Disclosure of Asserted Claims and Infringement Contentions in *AGIS Software Development LLC* v. *ZTE Corp et al.* (E.D. Texas), 2:17-cv-517, Jan. 19, 2018 (1001 pages).

Exhibit C for U.S. Pat. No. 9,445,251 Against Apple Accused Products; Attachment to Plaintiff's Preliminary Infringement Contentions in *AGIS Software Development LLC* v. *Apple, Inc.* (E.D. Texas), Case 2:17-cv-516; also Exhibit 1014 in IPR2018-00817, Mar. 22, 2018 (120 pages).

Exhibit C for U.S. Pat. No. 9,445,251 Against HTC Accused Products; Attachment to Plaintiff's Disclosure of Asserted Claims and Infringement Contentions in *AGIS Software Development LLC* v. *HTC Corp.* (E.D. Texas), 2:17-cv-514, Jan. 19, 2018 (313 pages).

Exhibit C for U.S. Pat. No. 9,445,251 Against Huawei Accused Products; Attachment to Plaintiff's Disclosure of Asserted Claims and Infringement Contentions in *AGIS Software Development LLC* v. *Huawei Device USA Inc. et al.* (E.D. Texas), Case 2:17-cv-513, Nov. 28, 2017 (314 pages).

Exhibit C for U.S. Pat. No. 9,445,251 Against LG Accused Products; Attachment to Plaintiff's Disclosure of Asserted Claims and Infringement Contentions in *AGIS Software Development LLC* v. *LG Electronics, Inc.* (E.D. Texas), 2:17-cv-515, Nov. 28, 2017 (335 pages).

Exhibit C for U.S. Pat. No. 9,445,251 Against ZTE Accused Products; Attachment to Plaintiff's Disclosure of Asserted Claims and Infringement Contentions in *AGIS Software Development LLC* v. *ZTE Corp et al.* (E.D. Texas), 2:17-cv-517, Jan. 19, 2018 (314 pages).

Exhibit D—Claim Chart for U.S. Pat. No. 9,467,838 Against Apple Accused Products; Attachment to Plaintiff's Preliminary Infringement Contentions in *AGIS Software Development LLC* v. *Apple, Inc.* (E.D. Texas), Case 2:17-cv-516; also Exhibit 1014 in IPR2018-00819, Mar. 22, 2018 (381 pages).

Exhibit D—Claim Chart for U.S. Pat. No. 9,467,838 Against HTC; Attachment to Plaintiff's Disclosure of Asserted Claims and Infringement Contentions in *AGIS Software Development LLC* v. *HTC Corp.* (E.D. Texas), 2:17-cv-514, Jan. 19, 2018 (329 pages).

Exhibit D—Claim Chart for U.S. Pat. No. 9,467,838 Against Huawei; Attachment to Plaintiff's Disclosure of Asserted Claims and Infringement Contentions in *AGIS Software Development LLC* v. *Huawei Device USA Inc. et al.* (E.D. Texas), Case 2:17-cv-513, Nov. 28, 2017 (312 pages).

Exhibit D—Claim Chart for U.S. Pat. No. 9,467,838 Against LG; Attachment to Plaintiff's Disclosure of Asserted Claims and Infringement Contentions in *AGIS Software Development LLC* v. *LG Electronics, Inc.* (E.D. Texas), 2:17-cv-515, Nov. 28, 2017 (329 pages)

Exhibit D—Claim Chart for U.S. Pat. No. 9,467,838 Against ZTE; Attachment to Plaintiff's Disclosure of Asserted Claims and Infringement Contentions in *AGIS Software Development LLC* v. *ZTE Corp et al.* (E.D. Texas), 2:17-cv-517, Jan. 19, 2018 (329 pages).

Garmin rino 110 2-way Radio & Personal Navigator; Owner's Manual and Reference Guide; Apr. 2003; 88pgs.

Gate5, "Mobile Community Solution: Context-sensitive Application Suite for Mobile Communities,"2002; 3pgs.

Gate5, "Mobile Guide Solution: Context-sensitive Applications for PDA-based Mobile City and Travel Guides," 2002; 4pgs.

GeoTIFF Format Specification, GeoTIFF Revision 1.0, Specification Version 1.8.1, Oct. 31, 1995 (102 pages); Exhibit 1018 in IPR2018-00817.

Grier, Robin. "VoIP—How to Use It to Cut Costs and Enhance Radio Access," Radio Resource Magazine, Jul. 2000 (4 pages).

Griswold, W. et al. "Active Campus—Sustaining Educational Communities through Mobile Technology," Technical Report CS2002-0714, University of California at San Diego, Jul. 2002, available at: https://pdfs.sematicsscholar.org/2de1/e05b22889171425bca873a66fd9f19ecda0c.pdf (19 pages).

Griswold, W. et al."ActiveCampus—Experiments in Community-Oriented Ubiquitous Computing," University of California at San Diego, published no later than Oct. 2004, available at https://cseweb.ucsd.edu/~wgg/Abstracts/ac-handhelds.pdf (8 pages).

Griswold, W. et al. "Using Mobile Technology to Create Opportunistic Interactions on a University Campus," Technical Report CS2002-0724, University of California at San Diego, Sep. 2002, available at: http://citeseerx.ist.psu.edu/viewdoc/download?doi=10.1.1.14.8249&rep=rep1&type=pdf (6 pages).

Hatfield, Dale N. "A Report on Technical and Operational Issues Impacting the Provision of Wireless Enhanced 911 Services," provided to the Federal Communications Commission on Oct. 15, 2002, (54 pages).

Hornbaek, K. et al. Navigation Patterns and Usability of Zoomable User Interfaces with and without an Overview. ACM Transactions on Computer-Human Interaction, v. 9, n. 4, Dec. 2002 (pp. 362-369); Exhibit 1019 in IPR2018-00817.

(56) References Cited

OTHER PUBLICATIONS

Horzepa, S. "APRS: Moving Hams on Radio and the Internet; A Guide to the Automatic Reporting System," The American Radio Relay League, Inc., copyright 2004 (156 pages).
Horzepa, S. "High-Speed Digital and Multimedia Working Group Is On," QST, Jun. 2002 (1 page).
HTC Corporation et al.'s Prior Art Listed in Their Invalidity Contentions, *AGIS Software Development LLC* v. *HTC Corporation et al.* (E.D. Texas), Case 2:17-cv-514, Aug. 30, 2018 (7 pages).
HTC Corporation's Answer, Defenses, and Counterclaims to AGIS Software Development, LLC's Complaint for Patent Infringement, filed in *AGIS Software Development LLC* v. *HTC Corp. Inc.* (E.D. Texas), Document 82 in Case 2:17-cv-514, Oct. 12, 2018 (19 pages).
HTC Corporation's Preliminary Election of Prior Art References, *AGIS Software Development LLC* v. *Huawei Device USA Inc. et al.* (E.D. Texas), 2:17-cv-514, Apr. 30, 2018 (6 pages).
IBM, Transmission Control Protocol / Internet Protocol. 2pgs. Available on the Internet at www.ibm.com/support/knowledgecenter/en/ssw_aix_61/com.ibm.aix.networkcomm/tcpip_intro.htm.
Index of Exhibits to Apple's Invalidity Contentions, *AGIS Software Development LLC* v. *LG Electronics, Inc. et al.* (E.D. Texas), Case 2:17-cv-516, Dec. 1, 2017 (11 pages).
Int'l Preliminary Report on Patentability (IPRP); for Int'l Patent App. No. PCT/JP2004/000250 dated Jul. 5, 2005; 4pgs.
Ion, Florence "From touch displays to the Surface: A brief history of touchscreen technology," Arstechnica, https://arstechnica.com/gadgets/2013/04/from-touch-displays-to-the-surface-a-brief-history-of-touchscreen-technology/, Apr. 4, 2013 (22 pages).
IPR2018-00817, Petition for Inter Partes Review of U.S. Pat. No. 9,445,251, filed on behalf of Apple Inc., Mar. 22, 2018 (85 pages).
IPR2018-00818, Petition for Inter Partes Review of U.S. Pat. No. 9,408,055, filed on behalf of Apple, Inc., Mar. 22, 2018 (86 pages).
IPR2018-00819, Petition for Inter Partes Review of U.S. Pat. No. 9,467,838, filed on behalf of Apple, Inc., Mar. 22, 2018 (91 pages).
IPR2018-00821, Petition for Inter Partes Review of U.S. Pat. No. 8,213,970, filed on behalf of Apple, Inc., Mar. 22, 2018 (85 pages).
IPR2018-01079, Petition for Inter Partes Review of U.S. Pat. No. 8,213,970, filed on behalf of Google, LLC, May 15, 2018 (89 pages).
IPR2018-01080, Petition for Inter Partes Review of U.S. Pat. No. 9,408,055, filed on behalf of Google LLC, May 15, 2018 (87 pages).
IPR2018-01081, Petition for Inter Partes Review of U.S. Pat. No. 9,445,251, filed on behalf of Google, LLC, May 15, 2018 (64 pages).
IPR2018-01082, Petition for Inter Partes Review of U.S. Pat. No. 9,445,251, filed on behalf of Google, LLC, May 15, 2018 (72 pages).
IPR2018-01083, Petition for Inter Partes Review of U.S. Pat. No. 9,445,251, filed on behalf of Google, LLC, May 15, 2018 (72 pages).
IPR2018-01084, Petition for Inter Partes Review of U.S. Pat. No. 9,445,251, filed on behalf of Google, LLC, May 15, 2018 (82 pages).
IPR2018-01085, Petition for Inter Partes Review of U.S. Pat. No. 9,467,838, filed on behalf of Google, LLC, May 15, 2018 (76 pages).
IPR2018-01086, Petition for Inter Partes Review of U.S. Pat. No. 9,467,838, filed on behalf of Google, LLC, May 15, 2018 (82 pages).
IPR2018-01087, Petition for Inter Partes Review of U.S. Pat. No. 9,467,838, filed on behalf of Google, LLC, May 15, 2018 (76 pages).
IPR2018-01088, Petition for Inter Partes Review of U.S. Pat. No. 9,467,838, filed on behalf of Google, LLC, May 15, 2018 (83 pages).
Joint Claim Construction Chart Pursuant to P.R. 4-5(D), filed in *AGIS Software Development LLC* v. *Huawei Device USA Inc. et al.* (E.D. Texas), Document 194 in Case 2:17-cv-513, Aug. 27, 2018 (4 pages).
Joint Motion to Stay All Deadlines and Notice of Settlement Regarding Huawei Defendants, filed in *AGIS Software Development LLC* v. *Huawei Device USA Inc. et al.* (E.D. Texas), Document 221 in Case 2:17-cv-513, Nov. 5, 2018 (6 pages).
Joint Statement of Stipulation Regarding Claim Construction, filed in *AGIS Software Development LLC* v. *HTC Corp. et al.* (E.D. Texas), Document 91 in Case 2:17-cv-514, Dec. 8, 2018 (5 pages).
Kim, R., "Find Friends by Cell Phone/Loop! Application's GPS Program Can Beam Map Location,"SFGate; Nov. 14, 2006; 2pgs.
Klabunde, Tim. "The Benefits of a VoIP Dispatch System," Mission Critical Communications, Aug. 2004 (3 pages).
Kutscher, Dirk et al. Drive-thru Internet: IEEE 802.11b for "Automobile" Users. IEEE Infocom, Mar. 7, 2004. 12pgs.
Lehman, J. "APRS and Search and Rescue," QST, Sep. 2003 (3 pages).
Lehman, J. "ARPS and Search and Rescue—Part 2," QST, Oct. 2003 (3 pages).
Life360's Rule 50(a) Motion for Judgment as a Matter of Law; *AGIS, Inc.* v. *Life360, Inc.* (S.D. Fl.); Mar. 12, 2015; 27pgs.
LocatioNet LBS Applications: MyMap description web page, published before 2004 upon information and belief; 13pgs.
LocatioNet Press Release: "LocatioNet Releases Ground Breaking Mass Market LBS Application Suite—LocatioNet MyMap," Mobile Location Services Congress; May 6, 2003; 2pgs.
Luna, L., "This Man Knows You Live . . . and Work and Play," Wireless Review; Sep. 1, 2002; pp. 24-32.
MapInfo Professional User's Guide Version 7.0, 2002 (752 pages); Exhibit 1021 in IPR2018-00817.
MapInfo. Spatially Enhancing Business Data with Geocoding Solutions: A MapInfo White Paper, 1997 (15 pages); Exhibit 1020 in IPR2018-00817.
McKinsey & Company. "Untitled Report," 2002 (133 pages).
Meggers, J. and Sang-Bum Parl, A, "A Multimedia Communication Architecture for Handheld Devices," IEEE Paper 0-7803-4872-9/98, Sep. 8-11, 1998; pp. 1245-1249.
Memory Map Remote Tracking, available on the Internet at https://web.archive.org/web/20060202161013/hltp:l/memory-map.com/; 2pgs.
Microsoft Computer Dictionary, Fifth Edition, 2002 (p. 479); Exhibit 21 to Defendants' Responsive Claim Construction Brief, filed in *AGIS Software Development LLC* v. *Huawei Device USA Inc. et al.* (E.D. Texas), Document 175-22 in Case 2:17-cv-513, Aug. 14, 2018 (5 pages).
Microsoft Computer Dictionary, Fifth Edition, 2002 (p. 502); Exhibit 12 to Defendants' Responsive Claim Construction Brief, filed in *AGIS Software Development LLC* v. *Huawei Device USA Inc. et al.* (E.D. Texas), Document 175-13 in Case 2:17-cv-513, Aug. 14, 2018 (4 pages).
Microsoft Corporation. Communication Services and Networking (Windows CE 5.0). 2006, 6pgs. Available on the Internet at https://msdn.microsoft.com/en-us/library/ms880996.aspx.
Mock, John H. et al. "A voice over IP solution for mobile radio interoperability," In Proceedings of IEEE 56th Vehicular Technology Conference, Sep. 2002 (4 pages).
Mockapetris, P. Network Working Group of Internet Engineering Task Force, Request for Comments 1034, Domain Names—Concepts and Facilities, Nov. 1987 (55 pages); Exhibit 1024 in IPR2018-00817.
Motorola Solutions, Dispatch Console Accessories, 2018 (3 pages).
Nielsen, J. Usability Engineering, 1993 (pp. 129-148); Exhibit 1017 in IPR2018-00821.
Norman, Donald A. The Psychology of Everyday Things, Chapter 1, The Psychopathology of Everyday Things, 1999 (pp. 1-33); Exhibit 1016 in IPR2018-00821.
Order: Conduct of the Proceeding, IPR 2018-01471 (*Apple Inc.* v. *AGIS Software Development LLC*; U.S. Pat. No. 9,749,829), Jan. 3, 2019 (4 pages).
Oxford American Dictionary of Current English, 1999 (p. 213); Exhibit 3 to Defendants' Responsive Claim Construction Brief, filed in *AGIS Software Development LLC* v. *Huawei Device USA Inc. et al.* (E.D. Texas), Document 175-4 in Case 2:17-cv-513, Aug. 14, 2018 (5 pages).

(56) References Cited

OTHER PUBLICATIONS

P.R. 4-3—Joint Claim Construction and Prehearing Statement, filed in *AGIS Software Development LLC v. Huawei Device USA Inc.* on Jun. 15, 2018 (9 pages).
P.R. 4-3—Updated Joint Claim Construction and Prehearing Statement, filed in *AGIS Software Development LLC v. Huawei Device USA Inc.* on Jul. 23, 2018 (9 pages).
Patent Owner's Preliminary Response, filed in IPR 2018-00817 (*Apple Inc. v. AGIS Software Development LLC*; U.S. Pat. No. 9,445,251), Jul. 5, 2018 (53 pages).
Patent Owner's Preliminary Response, filed in IPR 2018-00818 (*Apple Inc. v. AGIS Software Development LLC*; U.S. Pat. No. 9,408,055), Jul. 5, 2018 (38 pages).
Patent Owner's Preliminary Response, filed in IPR 2018-00821 (*Apple Inc. v. AGIS Software Development LLC*; U.S. Pat. No. 8,213,970), Jul. 24, 2018 (50 pages).
Patent Owner's Preliminary Response, IPR2018-00819 (*Apple Inc. v. AGIS Software Development LLC*; U.S. Pat. No. 9,467,838), Aug. 9, 2018 (51 pages).
Patent Owner's Preliminary Response, IPR2018-01079 (*Google LLC v. AGIS Software Development LLC*; U.S. Pat. No. 8,213,970), Aug. 23, 2018 (59 pages).
Patent Owner's Preliminary Response, IPR2018-01080 (*Google LLC v. AGIS Software Development LLC*; U.S. Pat. No. 9,408,055), Sep. 6, 2018 (41 pages).
Patent Owner's Preliminary Response, IPR2018-01081 (*Google LLC v. AGIS Software Development LLC*; U.S. Pat. No. 9,445,251), Sep. 13, 2018 (43 pages).
Patent Owner's Preliminary Response, IPR2018-01082 (*Google LLC v. AGIS Software Development LLC*; U.S. Pat. No. 9,445,251), Aug. 23, 2018 (38 pages).
Patent Owner's Preliminary Response, IPR2018-01083 (*Google LLC v. AGIS Software Development LLC*; U.S. Pat. No. 9,445,251), Oct. 11, 2018 (42 pages).
Patent Owner's Preliminary Response, IPR2018-01084 (*Google LLC v. AGIS Software Development LLC*; U.S. Pat. No. 9,445,251), Oct. 11, 2018 (32 pages).
Patent Owner's Preliminary Response, IPR2018-01085 (*Google LLC v. AGIS Software Development LLC*; U.S. Pat. No. 9,467,838), Aug. 23, 2018 (49 pages).
Patent Owner's Preliminary Response, IPR2018-01086 (*Google LLC v. AGIS Software Development LLC*; U.S. Pat. No. 9,467,838), Sep. 6, 2018 (53 pages).
Patent Owner's Preliminary Response, IPR2018-01087 (*Google LLC v. AGIS Software Development LLC*; U.S. Pat. No. 9,467,838), Oct. 11, 2018 (39 pages).
Patent Owner's Preliminary Response, IPR2018-01088 (*Google LLC v. AGIS Software Development LLC*; U.S. Pat. No. 9,467,838), Sep. 12, 2018 (43 pages).
Patent Owner's Preliminary Response, IPR2018-01471 (*Apple Inc. v. AGIS Software Development LLC*; U.S. Pat. No. 9,749,829), Nov. 28, 2018 (24 pages).
Patent Owner's Supplemental Preliminary Response to Corrected Petition for Inter Partes Review, IPR2018-01087 (*Google LLC v. AGIS Software Development LLC*; U.S. Pat. No. 9,467,838), Nov. 7, 2018 (6 pages).
Patent Owner's Supplemental Preliminary Response to Corrected Petition for Inter Partes Review, IPR2018-01088 (*Google LLC v. AGIS Software Development LLC*; U.S. Pat. No. 9,467,838), Nov. 7, 2018 (6 pages).
Patent Owner's Sur-Reply to Petitioner's Reply, IPR 2018-01471 (*Apple Inc. v. AGIS Software Development LLC*; U.S. Pat. No. 9,749,829), Jan. 18, 2019 (9 pages).
Perkins, Charles E. "Ad Hoc Networking, An Introduction," Nokia Research Center, Nov. 28, 2000 (28 pages).
Petition for Inter Partes Review of U.S. Pat. No. 9,749,829, IPR-01471, filed on behalf of Apple, Inc., Jul. 31, 2018 (85 pages).
Petitioner's Motion Under 37 C.F.R. § 42.104(C) to Correct Clerical Errors in the Petition, IPR2018-01087 (*Google LLC v. AGIS Software Development LLC*; U.S. Pat. No. 9,467,838), Oct. 31, 2018 (7 pages).
Petitioner's Motion Under 37 C.F.R. § 42.104(C) to Correct Clerical Errors in the Petition, IPR2018-01088 (*Google LLC v. AGIS Software Development LLC*; U.S. Pat. No. 9,467,838), Oct. 31, 2018 (7 pages).
Petitioner's Reply to Patent Owner Preliminary Response, IPR2018-01079 (*Google LLC v. AGIS Software Development LLC*; U.S. Pat. No. 8,213,970), Sep. 19, 2018 (8 pages).
Petitioner's Reply to Patent Owner Preliminary Response, IPR2018-01080 (*Google LLC v. AGIS Software Development LLC*; U.S. Pat. No. 9,408,055), Oct. 17, 2018 (9 pages).
Petitioner's Reply to Patent Owner Preliminary Response, IPR2018-01081 (*Google LLC v. AGIS Software Development LLC*; U.S. Pat. No. 9,445,251), Sep. 19, 2018 (9 pages).
Petitioner's Reply to Patent Owner Preliminary Response, IPR2018-01082 (*Google LLC v. AGIS Software Development LLC*; U.S. Pat. No. 9,445,251), Sep. 19, 2018 (9 pages).
Petitioner's Reply to Patent Owner Preliminary Response, IPR2018-01083 (*Google LLC v. AGIS Software Development LLC*; U.S. Pat. No. 9,445,251), Nov. 1, 2018 (9 pages).
Petitioner's Reply to Patent Owner Preliminary Response, IPR2018-01084 (*Google LLC v. AGIS Software Development LLC*; U.S. Pat. No. 9,467,838), Sep. 19, 2018 (9 pages).
Petitioner's Reply to Patent Owner Preliminary Response, IPR2018-01085 (*Google LLC v. AGIS Software Development LLC*; U.S. Pat. No. 9,467,838), Sep. 19, 2018 (9 pages).
Petitioner's Reply to Patent Owner Preliminary Response, IPR2018-01086 (*Google LLC v. AGIS Software Development LLC*; U.S. Pat. No. 9,467,838), Oct. 17, 2018 (9 pages).
Petitioner's Reply to Patent Owner Preliminary Response, IPR2018-01087 (*Google LLC v. AGIS Software Development LLC*; U.S. Pat. No. 9,467,838), Nov. 1, 2018 (6 pages).
Petitioner's Reply to Patent Owner Preliminary Response, IPR2018-01088 (*Google LLC v. AGIS Software Development LLC*; U.S. Pat. No. 9,467,838), Oct. 17, 2018 (9 pages).
Petitioner's Reply to Patent Owner's Preliminary Response, IPR2018-00817 (*Apple Inc. v. AGIS Software Development LLC*; U.S. Pat. No. 9,445,251), Aug. 10, 2018 (7 pages).
Petitioner's Reply to Patent Owner's Preliminary Response, IPR2018-00818 (*Apple Inc. v. AGIS Software Development LLC*; U.S. Pat. No. 9,408,055), Aug. 10, 2018 (7 pages).
Petitioner's Reply to Patent Owner's Preliminary Response, IPR2018-00819 (*Apple Inc. v. AGIS Software Development LLC*; U.S. Pat. No. 9,467,838), Aug. 10, 2018 (7 pages).
Petitioner's Reply to Patent Owner's Preliminary Response, IPR2018-00821 (*Apple Inc. v. AGIS Software Development LLC*; U.S. Pat. No. 8,213,970), Aug. 10, 2018 (7 pages).
Petitioner's Reply to Patent Owner's Preliminary Response Pursuant to Board's Order (Paper 7), IPR 2018-01471 (*Apple Inc. v. AGIS Software Development LLC*; U.S. Pat. No. 9,749,829), Jan. 10, 2019 (11 pages).
Plaintiff / Counterclaim-Defendant AGIS Software Development LLC Answer to Declaratory Judgment Counterclaims of Defendant / Counterclaim-Plaintiff HTC Corporation, filed in *AGIS Software Development LLC v. HTC Corp. et al.* (E.D. Texas), Document 86 in Case 2:17-cv-514, Nov. 2, 2018 (8 pages).
Plaintiff Advanced Ground Information Systems, Inc.'s Motions in Limine; *AGIS, Inc. v. Life360, Inc.* (S.D. Fl.); Feb. 19, 2015; 54pgs.
Plaintiff AGIS Software Development LLC's Opening Claim Construction Brief, filed in *AGIS Software Development LLC v. Huawei Device USA Inc. et al.* (E.D. Texas), Document 165 in Case 2:17-cv-513, Jul. 26, 2018 (41 pages).
Plaintiff AGIS Software Development LLC's Reply Claim Construction Brief, filed in *AGIS Software Development LLC v. Huawei Device USA Inc. et al.* (E.D. Texas), Document 186 in Case 2:17-cv-513, Aug. 20, 2018 (29 pages).
Plaintiff's Disclosure of Asserted Claims and Infringement Contentions, *AGIS Software Development LLC v. Apple, Inc.* (E.D. Texas), Case 2:17-cv-516, Sep. 18, 2017; also Exhibit 1016 in IPR2018-00817 (12 pages).

(56) References Cited

OTHER PUBLICATIONS

Plaintiff's Disclosure of Asserted Claims and Infringement Contentions, *AGIS Software Development LLC* v. *HTC Corp.* (E.D. Texas), 2:17-cv-514, Jan. 19, 2018 (23 pages).
Plaintiff's Disclosure of Asserted Claims and Infringement Contentions, *AGIS Software Development LLC* v. *Huawei Device USA Inc. et al.* (E.D. Texas), 2:17-cv-513, Nov. 28, 2017 (18 pages).
Plaintiff's Disclosure of Asserted Claims and Infringement Contentions, *AGIS Software Development LLC* v. *LG Electronics, Inc.* (E.D. Texas), 2:17-cv-515, Nov. 28, 2017 (16 pages).
Plaintiff's Disclosure of Asserted Claims and Infringement Contentions, *AGIS Software Development LLC* v. *ZTE Corp et al.* (E.D. Texas), 2:17-cv-517, Aug. 28, 2018 (21 pages).
Plaintiff's Disclosure of Asserted Claims and Infringement Contentions, *AGIS Software Development LLC* v. *ZTE Corp et al.* (E.D. Texas), 2:17-cv-517, Jan. 19, 2018 (20 pages).
Plaintiff's First Amended Complaint for Patent Infringement, filed in *AGIS Software Development LLC* v. *Apple, Inc.* (E.D. Texas), Document 32 in Case 2:17-cv-516, Sep. 18, 2017; also Exhibit 1013 in IPR2018-00817 (33 pages).
Plaintiff's First Amended Complaint for Patent Infringement, filed in *AGIS Software Development LLC* v. *Huawei Device USA Inc. et al.* (E.D. Texas), Document 32 in Case 2:17-cv-513, Aug. 17, 2017 (26 pages).
Plaintiff's First Amended Complaint for Patent Infringement, filed in *AGIS Software Development LLC* v. *ZTE Corp. et al.* (E.D. Texas), Document 32 in Case 2:17-cv-517, Oct. 17, 2017 (33 pages).
Plaintiff's Original Complaint for Patent Infringement, filed in *AGIS Software Development LLC* v. *Apple, Inc.* (E.D. Texas), Document 1 in Case 2:17-cv-516, Jun. 21, 2017 (26 pages).
Plaintiff's Original Complaint for Patent Infringement, filed in *AGIS Software Development LLC* v. *HTC Corp.* (E.D. Texas), Document 1 in Case 2:17-cv-514, Jun. 21, 2017; also Exhibit 1015 in IPR2018-00817 (24 pages).
Plaintiff's Original Complaint for Patent Infringement, filed in *AGIS Software Development LLC* v. *Huawei Device USA Inc., et al.* (E.D. Texas), Document 2 in Case 2:17-cv-513, Jun. 21, 2017; also Exhibit 1008 in IPR2018-01081 (24 pages).
Plaintiff's Original Complaint for Patent Infringement, filed in *AGIS Software Development LLC* v. *LG Electronics, Inc.* (E.D. Texas), Document 1 in Case 2:17-cv-515, Jun. 21, 2017 (24 pages).
Plaintiff's Original Complaint for Patent Infringement, filed in *AGIS Software Development LLC* v. *ZTE Corp. et al.* (E.D. Texas), Document 1 in Case 2:17-cv-517, Jun. 21, 2017 (25 pages).
Prior Art Listed in LG Electronics' Invalidity Contentions, *AGIS Software Development LLC* v. *LG Electronics, Inc. et al.* (E.D. Texas), Case 2:17-cv-514, Aug. 30, 2018 (9 pages).
PRNewswire, "Trimble GPS Technology Enables Seiko Epson; Communication Device and Wireless Data Service," accessed on the internet at: http://www.printthis.clickability.com/pt/cpt?expire=&title-Trimble+GPS+Technology+Enables+Seiko+Epson+Communication+Device+and+Wireless+Data+S . . . ; downloaded Jun. 16, 2016; 4pgs.
Python Documentation Release 2.0 Homepage, Oct. 16, 2000 (1 page); Exhibit 1022 in IPR2018-00817.
Python Library Reference, Section 7.2 Socket (4 pages); Exhibit 1023 in IPR2018-00817.
Ramjee, et al. IP-Based Access Network Infrastructure for Next-Generation Wireless Data Networks. IEEE Personal Communications, Aug. 2000. 8 pgs.
Rashbaum, William K. "Report on 9/11 Finds Flaws in Response of Police Dept," Jul. 27, 2002, available at https://www.nytimes.com/2002/07/27/nyregion/report-on-9-11-finds-flaws-in-response-of-police-dept.html (4 pages).
Rebuttal Expert Report of Joseph C. McAlexander III Regarding Validity of U.S. Pat. Nos. 8,213,970; 9,408,055; 9445,251; 9,467,838; and 9,749,829, IPR2018-01471 (*Apple Inc.* v. *AGIS Software Development LLC*; U.S. Pat. No. 9,749,829), Jan. 10, 2019 (400 pages).
Rotondo, Rick. "Locate—Track—Extract, Wireless Mesh Networking Allows Commanders to Keep Track of Firefighters at an Incident Scene," Public Safety Report, Mar. 2004 (3 pages).
Shareloc's Blog. "In Case You Were Wondering, We've Been Working . . . ," Navizon.com, available as of Feb. 20, 2006 according to Wayback Machine Internet Archive Record, obtained from: https://web.archive.org/web/20060220062317/http://navizon.typepad.com:80/ (7 pages).
Sharp, Duncan Scott. "Adapting Ad Hoc Network Concepts to Land Mobile Radio Systems,"Thesis, Master of Engineering, University of Alberta, copyright Dec. 2002 (98 pages).
Shneiderman, B. Designing the User Interface: Strategies for Effective Human-Computer Interaction, Third Edition, 1998 (252 pages); Exhibit 1018 in IPR2018-00821.
Simon, S. "The Pocket PC Goes Tactical," Law Enforcement Technology, May 2006, obtained from: https://web.archive.org/web/20070807202413/http://www.agisinc.com/Eprint_AGIS_4pg.pdf (4 pages).
Subbarao, Madhavi. "Mobile Ad Hoc Data Networks for Emergency Preparedness Telecommunications—Dynamic Power-Conscious Routing Concepts," Wireless Communications Technologies Group, Submitted as an interim project report on Feb. 1, 2000 (16 pages).
The ActiveCampus System, alleged in adverse proceedings to have been made available to the public no later than Oct. 30, 2005 by the University of California San Diego.
The AGIS LifeRing Project and its prototypes, alleged in adverse proceedings to have been made available to the public by Oct. 30, 2005 by AGIS.
The AT&T Find Friends System, alleged in adverse proceedings to have been made available to the public no later than Jun. 24, 2002 by AT&T.
The Automatic Packet/Position Reporting System, alleged in adverse proceedings to have been made available to the public no later than Sep. 21, 2004 by Bob Bruninga.
The BuddySpace system, alleged in adverse proceedings to have been made available to the public at least by Jun. 2002 and no later than Sep. 21, 2004 by the Open University.
The Force XXI Battle Command, Brigade and Below System, alleged in adverse proceedings to have been made available to the public no later than Mar. 21, 2003 by the U.S. Army.
The GateS system, which, upon information and belief, was sold and/or publicly used within the U.S. prior to 2004 and at least as early as 2002.
The LocatioNet system which, upon information and belief, was sold and/or publically used within the U.S. prior to 2004 and at least as early as 2003; 6pgs.
The Navizon System, alleged in adverse proceedings to have been made available to the public at least by Oct. 30, 2005 and no later than Feb. 20, 2006 by Navizon Inc.
Toppila, Pekka. TCP/IP in Cellular Mobile Environment. 1999, 7pgs.
Trupiano, Michael. "A Taxonomy for Assessing Fitness of Mobile Data Services in US Consumer Markets," Thesis, Master of Engineering, submitted to Massachusetts Institute of Technology on Feb. 1, 2001 (105 pages).
Vogiazou, Y. et al. "BuddySpace: Large-Scale Presence for Communities at Work and Play," Tech Report KMi-03-14, dated Sep. 2003 (8 pages).
Vogiazou, Y. et al. "From Buddyspace to CitiTag: Large-Scale Symbolic Presence for Community Building and Spontaneous Play," Tech Report KMi-04-25, dated Nov. 2004 (8 pages).
Vriendt, Johan De. et al. "Mobile Network Evolution: A Revolution on the Move," IEEE Communications Magazine, Apr. 2002 (8 pages).
Webster's New World Dictionary of Computer Terms, Eighth Edition, 2000 (p. 157); Exhibit 4 to Defendants' Responsive Claim Construction Brief, filed in *AGIS Software Development LLC* v. *Huawei Device USA Inc. et al.* (E.D. Texas), Document 175-5 in Case 2:17-cv-513, Aug. 14, 2018 (5 pages).
Zetter, Kim. How Attackers Can Use Radio Signals and Mobile Phones to Steal Protected Data. Wired, Nov. 3, 2004. 5pgs. Available on the Internet at www.wired.com/2014/11/airhopper-hack/.

(56) References Cited

OTHER PUBLICATIONS

ZTE (USA) Inc., and ZTE (TX), Inc.'s Second Election of Prior Art References, *AGIS Software Development LLC v. ZTE Corp. et al.* (E.D. Texas), 2:17-cv-514, Aug. 29, 2018 (7 pages).
Östman, L., "A Study of Location-Based Services Including a Design and Implementation of an Enhanced Friend Finder Client with Mapping Capabilities," Lulea Tekniska Univeritet; Aug. 31, 2001; 63pgs.
Joint Motion to Terminate Proceeding, IPR 2018-00819 (*Apple Inc. v. AGIS Software Development LLC*; U.S. Pat. No. 9,467,838), Mar. 22, 2019 (6 pages).
Decision Granting Joint Motion to Terminate, IPR 2018-00819 (*Apple Inc. v. AGIS Software Development LLC*; U.S. Pat. No. 9,467,838), Apr. 2, 2019 (3 pages).
Declaration of Dr. Jaime G. Carbonell, Ph.D., IPR2018-01079 (*Google LLC v. AGIS Software Development LLC*; U.S. Pat. No. 8,213,970), Mar. 29, 2019 (43 pages).
Deposition of David Hilliard Williams, IPR2018-01079 and IPR2018-01080 (*Google LLC v. AGIS Software Development LLC*; U.S. Pat. No. 8,213,970 and 9,408,055), Mar. 21, 2019 (transcription) (179 pages).
Patent Owner's Response, IPR2018-01079 (*Google LLC v. AGIS Software Development LLC*; U.S. Pat. No. 8,213,970), Mar. 29, 2019 (48 pages).
Deposition of Jaime Carbonell, Ph.D., IPR2018-01079 (*Google LLC v. AGIS Software Development LLC*; U.S. Pat. No. 8,213,970), Jun. 7, 2019 (transcription) (227 pages).
Supplemental Declaration of David H. Willaims, IPR2018-01079 (*Google LLC v. AGIS Software Development LLC*; U.S. Pat. No. 8,213,970), Jun. 28, 2019 (17 pages).
Microsoft Computer Dictionary, 1991 (pp. 253-254); Exhibit 1024 filed in IPR2018-01079 (*Google LLC v. AGIS Software Development LLC*; U.S. Pat. No. 8,213,970), Jun. 28, 2019 (4 pages).
Declaration of Dr. Jaime G. Carbonell in Support of Plaintiff's Opening Claim Construction Brief; Exhibit 1025 filed in IPR2018-01079 (*Google LLC v. AGIS Software Development LLC*; U.S. Pat. No. 8,213,970), Jun. 28, 2019 (42 pages).
Petitioner's Reply to Patent Owner's Response, IPR2018-01079 (*Google LLC v. AGIS Software Development LLC*; U.S. Pat. No. 8,213,970), Jun. 28, 2019 (31 pages).
Patent Owner's Request for Oral Argument, IPR2018-01079 (*Google LLC v. AGIS Software Development LLC*; U.S. Pat. No. 8,213,970), Jul. 22, 2019 (4 pages).
Petitioner Google LLC's Request for Oral Argument, IPR2018-01079 (*Google LLC v. AGIS Software Development LLC*; U.S. Pat. No. 8,213,970), Jul. 22, 2019 (4 pages).
Decision Denying Request for Rehearing, IPR2018-01079 (*Google LLC v. AGIS Software Development LLC*; U.S. Pat. No. 8,213,970), Jul. 25, 2019 (5 pages).
Patent Owner's Sur-Reply to Petitioner's Reply to Patent Owner's Response, IPR2018-01079 (*Google LLC v. AGIS Software Development LLC*; U.S. Pat. No. 8,213,970), Jul. 26, 2019 (21 pages).
Deposition of David Hilliard Williams, IPR2018-01079 (*Google LLC v. AGIS Software Development LLC*; U.S. Pat. No. 8,213,970), Jul. 24, 2019 (transcription) (64 pages).
Patent Owner Exhibit 2009, IPR2018-01079 (*Google LLC v. AGIS Software Development LLC*; U.S. Pat. No. 8,213,970), Aug. 28, 2019 (Patent Owner's Demonstrative Exhibits for Oral Hearing of Sep. 5, 2019) (85 pages).
Petitioner's Exhibit 1026, IPR2018-01079 (*Google LLC v. AGIS Software Development LLC*; U.S. Pat. No. 8,213,970), Aug. 28, 2019 (Petitioner's Demonstrative Exhibits for Oral Hearing of Sep. 5, 2019) (31 pages).
Record of Oral Hearing, IPR2018-01079 (*Google LLC v. AGIS Software Development LLC*; U.S. Pat. No. 8,213,970), Sep. 5, 2019 (67 pages).
Final Written Decision Determining All Challenged Claims Unpatentable, IPR2018-01079 (*Google LLC v. AGIS Software Development LLC*; U.S. Pat. No. 8,213,970), Nov. 19, 2019 (77 pages).
Declaration of Dr. Jaime G. Carbonell, Ph.D., IPR2018-01080 (*Google LLC v. AGIS Software Development LLC*; U.S. Pat. No. 9,408,055), Apr. 4, 2019 (33 pages).
Astro Digital XTL 5000 Consolette (Discontinued), Exhibit 2010 in IPR2018-01080 (*Google LLC v. AGIS Software Development LLC*; U.S. Pat. No. 9,408,055), Apr. 4, 2019 (1 page).
CommandSTAR Lite Console (Discontinued), Exhibit 2011 in IPR2018-01080 (*Google LLC v. AGIS Software Development LLC*; U.S. Pat. No. 9,408,055), Apr. 4, 2019 (1 page).
CommandSTAR Lite Desktop Console, Exhibit 2012 in IPR2018-01080 (*Google LLC v. AGIS Software Development LLC*; U.S. Pat. No. 9,408,055), Apr. 4, 2019 (4 pages).
Astro Digital Plus Consolette, Exhibit 2013 in IPR2018-01080 (*Google LLC v. AGIS Software Development LLC*; U.S. Pat. No. 9,408,055), Apr. 4, 2019 (4 pages).
Patent Owner's Response, IPR2018-01080 (*Google LLC v. AGIS Software Development LLC*; U.S. Pat. No. 9,408,055), Apr. 4, 2019 (41 pages).
Supplemental Declaration of David H. Willaims, IPR2018-01080 (*Google LLC v. AGIS Software Development LLC*; U.S. Pat. No. 9,408,055), Jul. 2, 2019 (23 pages).
Petitioner's Reply to Patent Owner's Response, IPR2018-01080 (*Google LLC v. AGIS Software Development LLC*; U.S. Pat. No. 9,408,055), Jul. 3, 2019 (32 pages).
Patent Owner's Sur-Reply to Petitioner's Reply to Patent Owner's Response, IPR2018-01080 (*Google LLC v. AGIS Software Development LLC*; U.S. Pat. No. 9,408,055), Jul. 29, 2019 (22 pages).
Patent Owner's Request for Oral Argument, IPR2018-01080 (*Google LLC v. AGIS Software Development LLC*; U.S. Pat. No. 9,408,055), Aug. 5, 2019 (4 pages).
Petitioner Google LLC's Request for Oral Argument, IPR2018-01080 (*Google LLC v. AGIS Software Development LLC*; U.S. Pat. No. 9,408,055), Aug. 5, 2019 (4 pages).
Patent Owner Exhibit 2015, IPR2018-01080 (*Google LLC v. AGIS Software Development LLC*; U.S. Pat. No. 9,408,055), Aug. 28, 2019 (Patent Owner's Demonstrative Exhibits for Oral Hearing of Sep. 6, 2019) (73 pages).
Petitioner's Exhibit 1045, IPR2018-01080 (*Google LLC v. AGIS Software Development LLC*; U.S. Pat. No. 9,408,055), Aug. 29, 2019 (Petitioner's Demonstrative Exhibits for Oral Hearing of Sep. 6, 2019) (16 pages).
Record of Oral Hearing, IPR2018-01080 (*Google LLC v. AGIS Software Development LLC*; U.S. Pat. No. 9,408,055), Sep. 6, 2019 (54 pages).
Final Written Decision Determining All Claims Unpatentable, IPR2018-01080 (*Google LLC v. AGIS Software Development LLC*; U.S. Pat. No. 9,408,055), Dec. 2, 2019 (104 pages).
ZTE (USA) Inc., and ZTE (TX), Inc.'s Preliminary Election of Prior Art References, *AGIS Software Development LLC v. ZTE Corp. et al.* (E.D. Texas), 2:17-cv-517, Apr. 30, 2018 (7 pages); cited as Exhibit 2004 in IPR2019-00389 (*ZTE (USA), Inc. et al. v. AGIS Software Development LLC*; U.S. Pat. No. 9,467,838).
Patent Owner's Preliminary Response, IPR2019-00389 (*ZTE (USA), Inc. et al. v. AGIS Software Development LLC*; U.S. Pat. No. 9,467,838), Apr. 10, 2019 (35 pages).
Defendants HTC Corp. et al.'s Invalidity Contentions Pursuant to Patent Local Rule 3-3, *AGIS Software Development LLC v. Huawei Device USA Inc. et al.* (E.D. Texas), 2:17-cv-513, Mar. 15, 2018 (6 pages); cited as Exhibit 2003 in IPR2019-00389 (*ZTE (USA), Inc. et al. v. AGIS Software Development LLC*; U.S. Pat. No. 9,467,838).
Decision Denying Institution of Inter Partes Review, IPR2019-00389 (*ZTE (USA), Inc. et al. v. AGIS Software Development LLC*; U.S. Pat. No. 9,467,838), Jul. 2, 2019 (11 pages).
Defendants Huawei Device USA Inc. et al.'s Invalidity Contentions Pursuant to Patent Local Rule 3-3, *AGIS Software Development LLC v. Huawei Device USA Inc. et al.* (E.D. Texas), 2:17-cv-513, Feb. 6, 2018 (7 pages); cited as Exhibit 2002 in IPR2019-00403 (*Google LLC v. AGIS Software Development LLC*; U.S. Pat. No. 9,467,838).
Patent Owner's Preliminary Response, IPR2019-00403 (*Google LLC v. AGIS Software Development LLC*; U.S. Pat. No. 9,467,838), Apr. 17, 2019 (33 pages).

(56) References Cited

OTHER PUBLICATIONS

Order Dismissing the Petition and Motion for Joinder and Terminating the Proceeding, IPR2019-00403 (*Google LLC* v. *AGIS Software Development LLC*; U.S. Pat. No. 9,467,838), Jul. 9, 2019 (4 pages).
Joint Motion to Dismiss the Petition, IPR2019-00411 (*Apple Inc.* v. *AGIS Software Development LLC*; U.S. Pat. No. 8,213,970), Mar. 22, 2019 (6 pages).
Decision Granting Joint Motion to Dismiss, IPR2019-00411 (*Apple Inc.* v. *AGIS Software Development LLC*; U.S. Pat. No. 8,213,970), Apr. 3, 2019 (3 pages).
Joint Motion to Dismiss the Petition, IPR2019-00432 (*Apple Inc.* v. *AGIS Software Development LLC*; U.S. Pat. No. 9,408,055), Mar. 22, 2019 (6 pages).
Decision Granting Joint Motion to Dismiss, IPR2019-00432 (*Apple Inc.* v. *AGIS Software Development LLC*; U.S. Pat. No. 9,408,055), Apr. 3, 2019 (3 pages).
Patent Owner's Preliminary Response, IPR2019-00485 (*HTC Corp. et al.* v. *AGIS Software Development LLC*; U.S. Pat. No. 8,213,970), Apr. 15, 2019 (28 pages).
Defendants HTC Corp. et al.'s Invalidity Contentions Pursuant to Patent Local Rule 3-3, *AGIS Software Development LLC* v. *Huawei Device USA Inc. et al.* (E.D. Texas), 2:17-cv-513, Mar. 15, 2018 (6 pages); cited as Exhibit 2003 in IPR2019-00485 (*HTC Corp. et al.* v. *AGIS Software Development LLC*; U.S. Pat. No. 8,213,970).
Decision Denying Institution of Inter Partes Review, IPR2019-00485 (*HTC Corp. et al.* v. *AGIS Software Development LLC*; U.S. Pat. No. 8,213,970), Jul. 1, 2019 (12 pages).
Defendants HTC Corp. et al.'s Invalidity Contentions Pursuant to Patent Local Rule 3-3, *AGIS Software Development LLC* v. *Huawei Device USA Inc. et al.* (E.D. Texas), 2:17-cv-513, Mar. 15, 2018 (6 pages); cited as Exhibit 2003 in IPR2019-00487 (*ZTE (USA), Inc. et al.* v. *AGIS Software Development LLC*; U.S. Pat. No. 9,408,055).
Patent Owner's Preliminary Response, IPR2019-00487 (*ZTE (USA), Inc. et al.* v. *AGIS Software Development LLC*; U.S. Pat. No. 9,408,055), May 6, 2019 (17 pages).
Decision Denying Institution of Inter Partes Review, IPR2019-00487 (*ZTE (USA), Inc. et al.* v. *AGIS Software Development LLC*; U.S. Pat. No. 9,408,055), Jul. 30, 2019 (7 pages).
Joint Motion to Dismiss the Petition, IPR2019-00523 (*Apple Inc.* v. *AGIS Software Development LLC*; U.S. Pat. No. 9,445,251), Mar. 22, 2019 (6 pages).
Decision Granting Joint Motion to Dismiss, IPR2019-00523 (*Apple Inc.* v. *AGIS Software Development LLC*; U.S. Pat. No. 9,445,251), Apr. 2, 2019 (3 pages).
Joint Motion to Dismiss the Petition, IPR2019-00524 (*Apple Inc.* v. *AGIS Software Development LLC*; U.S. Pat. No. 9,445,251), Mar. 22, 2019 (6 pages).
Decision Granting Joint Motion to Dismiss, IPR2019-00524 (*Apple Inc.* v. *AGIS Software Development LLC*; U.S. Pat. No. 9,445,251), Apr. 2, 2019 (3 pages).

\* cited by examiner

METHOD TO PROVIDE AD HOC AND PASSWORD PROTECTED DIGITAL AND VOICE NETWORKS

CROSS REFERENCE TO RELATED APPLICATIONS

This application claims priority to and is a continuation of co-pending U.S. patent application Ser. No. 15/809,102, filed on Nov. 10, 2017, which is a continuation of U.S. patent application Ser. No. 15/722,660, filed on Oct. 2, 2017, now U.S. Pat. No. 10,299,100 issued on May 21, 2019, which is a continuation of U.S. patent application Ser. No. 15/469,469, filed on Mar. 24, 2017, now U.S. Pat. No. 10,292,033 issued on May 14, 2019, which is a continuation of U.S. patent application Ser. No. 15/287,638, filed on Oct. 6, 2016, now U.S. Pat. No. 9,706,381 issued on Jul. 11, 2017, which is a continuation of U.S. patent application Ser. No. 14/529,978, filed on Oct. 31, 2014, now U.S. Pat. No. 9,467,838 issued Oct. 11, 2016 which is a continuation-in-part of U.S. patent application Ser. No. 14/027,410, filed on Sep. 16, 2013, now U.S. Pat. No. 8,880,042 issued Nov. 4, 2014, which is a continuation of U.S. patent application Ser. No. 13/751,453, filed Jan. 28, 2013, now U.S. Pat. No. 8,538,393 issued Sep. 17, 2013, which is a continuation-in-part of U.S. patent application Ser. No. 12/761,533 filed on Apr. 16, 2010, now U.S. Pat. No. 8,364,129 issued Jan. 29, 2013, which is a continuation-in-part of U.S. patent application Ser. No. 11/615,472 filed on Dec. 22, 2006, now U.S. Pat. No. 8,126,441 issued on Feb. 28, 2012, which is a continuation-in-part of U.S. patent application Ser. No. 11/308,648 filed Apr. 17, 2006, now U.S. Pat. No. 7,630,724 issued on Dec. 8, 2009, which is a continuation-in-part of U.S. patent application Ser. No. 10/711,490, filed on Sep. 21, 2004, now U.S. Pat. No. 7,031,728 issued on Apr. 18, 2006. All of the preceding applications are incorporated herein by reference in their entirety.

BACKGROUND OF THE INVENTION

Field of the Invention

A communications method and system using a plurality of cellular phones each having an integrated Personal Digital Assistant (PDA) and Global Positioning System (GPS) receiver for the management of two or more people through the use of a communications network. The method and system provide each user with an integrated handheld cellular/PDA/GPS/phone that has Advanced Communication Software application programs (hereinafter referred to as ACS) and databases used in conjunction with a remote Server that enable a user to quickly establish a communication network of cell phone participants having a common temporary ad hoc network using mobile wireless communication devices.

The invention includes a method and communication system to quickly set up and provide ad hoc, password protected, digital and voice networks to allow a group of people to be able to set up a network easily and rapidly, especially in an emergency situation.

Description of Related Art

The purpose of a communications system is to transmit digital messages from a source, located at one point, to user destination(s), located at other point(s) some distance away. A communications system is generally comprised of three basic elements: transmitter, information channel and receiver. One form of communication in recent years is cellular phone telephony. A network of cellular communication systems set up around an area such as the United States allows multiple users to talk to each other, either on individual calls or on group calls. Some cellular phone services enable a cellular phone to engage in conference calls with a small number of users. Furthermore, cellular conference calls can be established through 800 number services. Cellular telephony also now includes systems that include GPS navigation that utilizes satellite navigation. These devices thus unite cellular phone technology with navigation information, computer information transmission and receipt of data.

The method and operation of communication devices used herein are described in U.S. Pat. No. 7,031,728 which is hereby incorporated by reference and U.S. Pat. No. 7,630,724.

Military, first responder, and other public and private emergency groups need to be able to set up ad hoc digital and voice networks easily and rapidly. These private networks may be temporary or longer lasting in nature. The users need to be able to rapidly coordinate their activities eliminating the need for pre-entry of data into a web and or identifying others by name, phone numbers or email addresses so that all intended participants that enter the agreed ad hoc network name and password are both digitally and voice interconnected. When a user or users leave the network, no data concerning the network participants need be retained.

Coordinating different organizations at the scene of a disaster presents several problems as there are voice and digital data (text messages) communications that need to be constantly occurring up and down the chain of command. As an example, communications are required from a police chief to a police captain to a police lieutenant to a police sergeant to a policeman and then back up the same chain of command. Digital data exchange of GPS data or other means provides the location component of the units. Digital chat, text messages, white boards and photo video exchange provide extensive collaboration. However, during a disaster, other first responders such as fire departments must become engaged. While the fire department users may have voice and digital data (text messages) communications up and down their chain of command, these individuals do not have the ability to cross communicate necessarily with police units without a substantial degree of immediate coordination. The method and system in accordance with the present invention described herein discloses how digital communications along with Personal Computer (PC) and PDA devices can be used to quickly establish user specific password protected private ad hoc voice and data networks to enable both data and voice communications up and down their chain of command and simultaneously with different, not pre-known, organizations responding to a disaster. The invention defines a method of accomplishing this by providing all personnel that need to communicate with each other with a PC or PDA which are interconnected to a Server using cellular or other communications.

SUMMARY OF THE INVENTION

Applicant's communication system and method described herein is embodied in the Advanced Communication Software (ACS) application programs developed by applicant and installed in the integrated PDA/GPS cell phones used herein and remote Servers.

A plurality of Internet Protocol (IP) capable PDA/GPS devices each having ACS application programs and databases provides a communication network in conjunction with a remote Server that provides the ability to: a) establish an ad hoc network of devices so that the devices can either broadcast to a group or selectively transmit to each of the other; each PDA/GPS phone starts by requesting access to the Server and identifying a mutually agreed to network name and password and once granted, reports its GPS position and status; the Server then routes the data to all signed on network participants so that each of the devices exchange location, status and other information; (b) force the received information to the recipient's display and enable the recipient to acquire additional information by touching the display screen at a remote phone's location on the PDA display; (c) make calls to or send data to remote phones by touching their display symbols and selecting the appropriate soft switch; (d) layer a sufficient number of soft switches or buttons on the PDA display to perform the above functions without overlaying the map; and (e) allow a polling mode in each cell phone that permits a user to contact other cell phone users that have a common interest or relationship with a password and identifier for communication and to establish quickly a temporary ad hoc network especially in an emergency.

A communication Server acts as a forwarder for IP communications between any combination of cell phone/PDA users and/or PC based users. Network participant location, identity and status messages are sent to the Server by each user. Network participant entered tracks are also sent to the Server. Because this network participant location and track data is of interest to all the network participants, the Server forwards the data received from one participant to all other participants, causing their displays automatically, without any operator action, to display the received information, thus providing the information necessary for all network participants to know the identity, location and status of all other network participants.

The Server also acts as a forwarder of data addressed from one participant to one or more addressed participants, thus permitting the transmission of free text, preformatted messages, photographs, video, Email and Uniform Resource Locator (URL) data from one network participant to other selected network participants.

The above functions can also be accomplished using peer to peer WiFi, WiMax or other peer to peer communications. However, for use with cellular communications and to assure the level of security that cell phone companies require, a centralized static IP routable Server is used.

The IP Server also fills another role of being a database from which data can be requested by network participants (i.e. maps, satellite images, and the like) or can be pushed to network participants (i.e. symbology and soft switch changes, and the like). The Server is used to establish an ad hoc network within certain groups using an ad hoc event name and password.

This invention provides a method and a system establishing an ad hoc password protected digital and voice network that can be temporarily set up or longer lasting in nature. The invention described herein allows users to rapidly coordinate their activities without having to pre-enter data into a web or identify others by name, E mail addresses or phone numbers. Essentially the users that establish the ad hoc and password protected digital and voice networks are required to enter the Server's IP address and an ad hoc event name and a password. In the case of military and first responders, the name of the user's unit may also be used. This action causes the specific PDA or PC of the user to commence reporting directly to the Server's IP address. Once the Server receives the initial IP message from the user's PDA or PC, the server can commence to exchange data with the user's PDA or PC. The initial IP message may also contain additional data such as a license number and, if desired, a phone number manually entered or automatically acquired by the ACS. The IP address of the PDA and PC unit sending the initial IP message is stored by the Server. The Server then responds with a message notifying the user that his PC/PDA is connected to the Server. The user PDA/PC then reports its GPS location and other status information directly to the Server. This information is retained by the Server even when there are no other devices initially communicating with the Server. When the other user's devices sign on to the Server with the same ad hoc event name and password, the Server software then recognizes all the users and stores their IP addresses in the Server. Thus the Server has all the users IP addresses stored and can pass location and status information among the ad hoc network participants even though the network participants have not entered other network participants' names, phone numbers or email addresses. Thus one of the purposes of the invention is to allow an ad hoc network to be formed on a temporary basis in a rapid manner.

When using the PTT feature, the ACS can enable the network participant to: 1. PTT with all that are in the ad hoc digital network, or 2. PTT with select specific network participants, by touching their symbol(s) and then selecting PTT soft switch or 3. Specify a group of the network participants by assigning their symbols or unit names to a list of network participants and then associating the list with a soft switch whose function is to enable the operator to have PTT communications with all in the list.

Since only one person is transmitting on a PTT voice network at any given time, the receiving network participant's ACS can relate the PTT IP address to the IP address of the unit transmitting his identification on the digital ad hoc network. This information can then be used by the other PTT networked participant's ACS to: 1. flash the transmitting unit's name on their PDA/PC screens or 2. if a photograph has been attached to the ad hoc digital network symbol of the PTT transmitting person, to flash that photograph on the receiving unit's PDA/PC display.

It is an object of this invention to enable each participant in the communication network to join other ad hoc network participants to form an ad hoc digital and voice network with other cell phone users rapidly for coordinating member activities.

In accordance with these and other objects which will become apparent hereinafter, the instant invention will now be described with particular reference to the accompanying drawings.

PREFERRED EMBODIMENT OF THE INVENTION

A method and communication system that joins a communications network of participants using handheld cell phones having integrated PDA and GPS circuitry with ACS application programs that allow a participant having an ACS equipped cell phone to provide an ad hoc and password protected digital and voice network.

A communication Server acts as a forwarder for IP communications between any combination of cell phone/PDA users and/or PC based user. Network participant location, identity and status messages are sent to the Server by each user. Network participant entered tracks are also sent to the Server. Because this data is of interest to all the network participants, the Server forwards the data received from one participant to all other participants, thus providing the information necessary for all network participants to know the identity, location and status of all other network participants.

The Server allows the set up of the ad hoc network with an ad hoc event name and a password.

The Server also acts as a forwarder of data addressed from one participant to one or more addressed participants, thus permitting the transmission of free text, preformatted messages, photographs, video, email and URL data from one network participant to other selected network participants.

Figure 1:
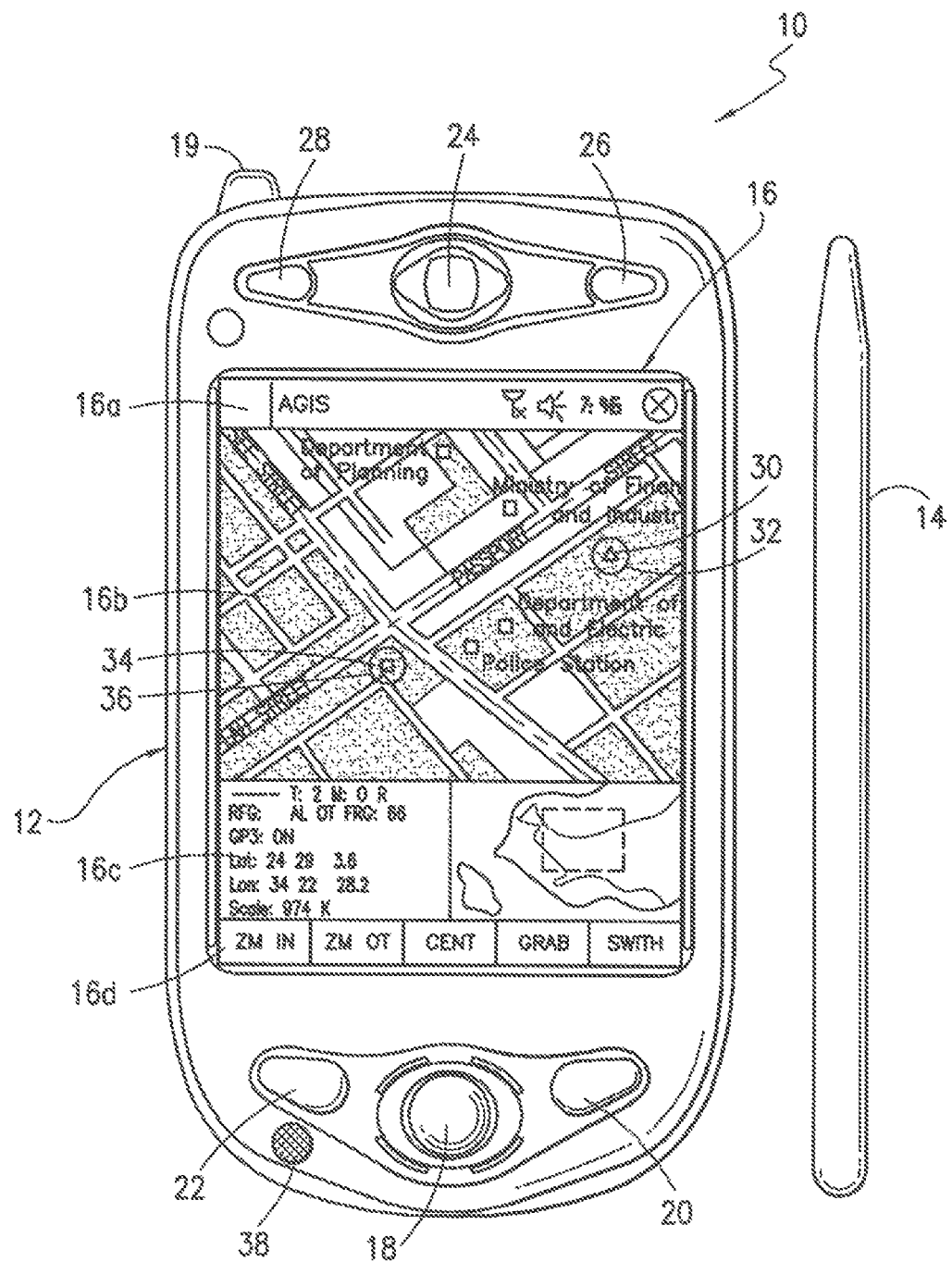
FIG. 1 shows a front plan view of a cellular phone/PDA/GPS having a touch screen.

Referring now to the drawings and, in particular, to FIG. 1, a small handheld cellular phone 10 is shown that includes a PDA and a GPS communications device integrated in housing 12 that includes an on/off power switch 19, a microphone 38, and a Liquid Crystal Display (LCD) display 16 that is also a touch screen system. The small area 16a is the navigation bar that depicts the telephone, GPS and other status data and the active software. Each cell phone includes a Central Processing Unit (CPU) and databases that store information useful in the communication network. The CPU also includes a symbol generator for creating touch screen display symbols discussed herein. With the touch screen 16, the screen symbols are entered through GPS inputs or by the operator using a stylus 14 (or operator finger) by manipulatively directing the stylus 14 to literally touch display 16. The soft switches 16d displayed on the display 16 are likewise activated by using a stylus 14 and physically and manipulatively directing the stylus to literally touch display 16. The display x, y coordinates of the touched point are known by a CPU in the PDA section of the communication system in housing 12 that can coordinate various information contained in the PDA relative to the x, y coordinate position on the display 16. Inside housing 12 is contained the conventional cellular phone elements including a modem, a CPU for use with a PDA and associated circuitry connected to speaker 24 and microphone 38. A GPS navigational receiver that receives signals from satellites that can determine the latitude and longitude of the cellular phone housing 12 can be internal or external to the housing 12. Conventional PDA/cellular phones are currently on sale and sold as a unit (or with an external connected GPS) that can be used for cellular telephone calls and sending cellular Short Message Service (SMS) and Transmission Control Protocol (TCP) TCP/IP or other messages using the PDA's display 16 and computer CPU. The GPS system including a receiver in housing 12 is capable of determining the latitude and longitude and through SMS, TCP/IP, WiFi or other digital messaging software, to also transmit this latitude and longitude information of housing 12 to other cellular phones in the communication network via cellular communications, WiFi or radio. The device 10 includes a pair of cellular phone hardware activating buttons 20 to turn the cellular phone on and 22 to turn the cellular phone off. Navigation pad actuator 18 is similar to a joy or force stick in that the actuator 18 manually provides movement commands that can be used by the PDA's software to move a cursor on display 16. Switches 26 and 28 are designed to quickly select an operator specified network software program. Speaker 24 and microphone 38 are used for audio messages. Switch 19 at the top left of device 10 is the power on and power off switch for the entire device.

The heart of the invention lies in the applicant's ACS application programs provided in the device. The ACS programs are activated by clicking on an icon on the display to turn the ACS programs on or off. Mounted within housing 12 as part of the PDA is the display 16 and the CPU. The internal CPU includes databases and software application programs that provide for a geographical map and georeferenced entities that are shown as display portion 16b that includes as part of the display various areas of interest in the particular local map section.

When looking at display 16, the software switches (soft switches) which appear at the very bottom of the display 16d are used to control by touch many of the software driven functions of the cellular phone and PDA. The soft switches are activated through the operator's use of the navigation pad 18, or a small track ball, force stick or similar hardware display cursor pointing device. Alternatively, the operator may choose to activate the software switches by touching the screen with a stylus 14 (or finger) at the switches' 16d locations. When some of the software switches are activated, different software switches appear. The bar display 16d shows the software switches "ZM IN (zoom in)," "ZM OT (zoom out)," "CENT (center)" and "GRAB (pan/grab)" at the bottom of the screen. These software switches enable the operator to perform these functions. The "SWITH (switch)" software switch at the lower right causes a matrix of layered software switches (soft switches) to appear above the bottom row of switches. Through use of the software switches, the operator can also manipulate the geographical map 16b or chart display. When looking at FIG. 1, display symbols depicting permanent geographical locations and buildings are shown. For example, the police station is shown and, when the symbol is touched by the stylus or finger, the latitude and longitude of the symbol's location, as shown in display section 16c, is displayed at the bottom left of the screen. The bottom right side of display 16c is a multifunction inset area that can contain a variety of information including: a) a list of the communication link participants; b) a list of received messages; c) a map, aerial photograph or satellite image with an indication of the zoom and offset location of the main map display, which is indicated by a square that depicts the area actually displayed in the main geographical screen 16b; d) applicable status information; and e) a list of the communication net participants. Each participant user would have a device 10 shown in FIG. 1.

Also shown on the display screen 16, specifically the geographical display 16*b*, is a pair of different looking symbols 30 and 34, a small triangle and a small square, which are not labeled. These symbols 30 and 34 can represent communication net participants having cellular phones in the displayed geographical area that are part of the overall cellular phone communications net, each participant having the same device 10 used. The latitude and longitude of symbol 30 is associated within a database with a specific cell phone number and, if available, its IP address and email address. The screen display 16*b*, which is a touch screen, provides x and y coordinates of the screen 16*b* to the CPU's software from a map in a geographical database. The software has an algorithm that relates the x and y coordinates to latitude and longitude and can access a communications net participant's symbol or a fixed or movable entity's symbol as being the one closest to that point.

In order to initiate a telephone call to the cellular phone user (communication net participant) represented by symbol (triangle) 30 at a specific latitude and longitude display on chart 16*b*, the operator touches the triangle 30 symbol with the stylus 14. The user then touches a "call" software switch from a matrix of displayed soft switches that would overlay the display area 16*c*. Immediately, the cellular phone will initiate a cellular telephone call to the cellular phone user at the geographical location shown that represents symbol 30. A second cellular phone user (communication net participant) is represented by symbol 34 which is a small square (but could be any shape or icon) to represent an individual cellular phone device in the display area. The ring 32 around symbol 30 indicates that the symbol 30 has been touched and that a telephone call can be initiated by touching the soft switch that says "call." When this is done, the telephone call is initiated. Other types of symbolic elements on the display 16 can indicate that a cellular phone call is in effect. Additionally, the operator can touch both symbol 34 and symbol 30 and can activate a conference call between the two cellular phones and users represented by symbols 30 and 34. Again, a symbolic ring around symbol 34 indicates that a call has been initiated.

Equally important, a user can call the police station, or any other specific geographical facility displayed on the map including: buildings, locations of people, vehicles, facilities, restaurants, or the like, whose cellular phone numbers and, if available, Email addresses, IP addresses and their URLs (previously stored in the database) by touching a specific facility location on the map display using the stylus 14 and then touching the cellular phone call switch. As an example, the operator can touch and point to call a restaurant using a soft switch by touching the restaurant location with a stylus and then touching the call soft switch. The cellular phone will then call the restaurant. Thus, using the present invention, each participant can touch and point to call to one or more other net participants symbolically displayed on the map, each of whom has a device as shown in FIG. 1, and can also point to call facilities that had been previously stored in the phone's database. Furthermore, this symbol hooking and soft switch technique can be used to go to a fixed facility's website or to automatically enter the fixed facility's email address in an email.

Each cellular phone/PDA/GPS user device is identified on the map display of the other network participant user's phone devices by a display symbol that is generated on each user phone display to indicate each user's own location and identity. Each symbol is placed at the correct geographical location on the user display and is correlated with the map on the display and is transmitted and automatically displayed on the other network participant's PC and PDA devices. The operator of each cellular phone/PDA/GPS device may also enter one or more other fixed entities (buildings, facilities, restaurants, police stations, etc.) and geo-referenced events such as fires, accidents, etc., into its database. This information can be likewise transmitted to all the other participants on the communications net and automatically displayed. The map, fixed entities, events and cellular phone/PDA/GPS device communication net participants' latitude and longitude information is related to the "x" and "y" location on the touch screen display map by a mathematical correlation algorithm.

When the cellular phone/PDA/GPS device user uses a stylus or finger to touch one or more of the symbols or a location displayed on the cellular phone map display, the system's software causes the status and latitude and longitude information concerning that symbol or location to be displayed. In order to hook a symbol or "track" such as another net participant which represents an entity on the geo-referenced map display, or a fixed geographical entity such as a restaurant, police station or a new entity observed by a cell phone user which is discussed below, the operator touches at or near the location of a geo-referenced symbol appearing on the cellular phone/PDA display that represents a specific track or specific participant or other entity. The hook application software determines that the stylus (or finger) is pointed close to or at the location of the symbol and puts a circle, square or other indication around the symbol indicating that amplification information concerning the symbol is to be displayed. The operator can hook entered tracks or his own track symbol and add data or change data associated with the indicated symbol. The hook application code then sends a message to the database application code to store the facility or entity's updated data. The display application code retrieves the primary data and amplification data concerning the symbol or entity from the database and displays the information at the correct screen location. The operator can then read the amplification data that relates to that specific symbol at the specific location. The cell phone operator can also select soft switches on the touch screen display to change the primary data and amplification data. Furthermore, the operator can use a similar method of hooking and selecting to activate particular soft switches to take other actions which could include: making cellular phone calls, conference calls, 800 number calls; sending a free text message, operator selected preformatted messages, photographs or videos to the hooked symbol; or to drop an entered symbol.

Each known net participant has a cellular phone number, IP address and, if available, Email address that is stored in each participant's device database.

To use the communication system, a user starts the PDA/cellular phone device system by turning on the cell phone power and selecting the cell phone and network software which causes: a) the cellular phone to be activated (if it has not already been activated); b) the GPS interface receiver to be established; c) a map of the geographic area where the operator is located and operator's own unit symbol to appear at the correct latitude and longitude on the map on the display; d) the locations of fixed facilities such as restaurants, hotels, fire departments, police stations, and military barracks, that are part of the database to appear as symbols on the map; e) the device selected item read out area which provides amplification information for the communications net participants or the entity that has been hooked (on the display screen) to appear on the display; f) an insert area that contains various data including: the list of net participants, a list of messages to be read, an indication of what portion of the map is being displayed in major map area and other information to appear on the display; and g) a row of primary software created "soft switches" that are always present on the display to appear.

For point to call network units and fixed facilities, the application code detects the x, y display screen location of the symbol that is designated by the user's stylus and translates the x, y coordinates to latitude and longitude and then: (1) searches the database to find the symbol at that location, (2) places a "hook" indicator (a circle, square or other shape) around the symbol, (3) displays any amplifying data and (4) obtains the symbol's associated phone number (or, for Voice over IP (VoIP) an IP address) from the database. Upon receiving a "call" designation from the soft switch, the operator's device's ACS causes the appropriate phone number or IP address to be called. Upon receiving an indication that the phone number is being called, the application code places a box around the symbol (color, dashed or the like). When the call is connected, the box changes to indicate that the connection is made. When the other party hangs up, the box disappears.

As each of the cell phone participants reports its identity, location and status to the other participants' devices, the received data is automatically geo-referenced and filed in their databases that are accessible by identity and by location. This data is then displayed on each cell phone display. When a request for data is received by touching the display screen, a location search is made by the ACS and a symbol modifier (circle, square, etc.) is generated around the symbol closest to the x, y position of the stylus. When the application code receives a soft switch command to place a phone call or send data, the software uses the phone number (or IP address) associated with the unit to place the call or to send data.

If a cell phone device receives a digital message that a call is being received, the receiving cell phone's ACS application code places a box or similar object around the transmitter symbol indicating who the call is from. When the call is answered, the application software changes the visual characteristics of the box. In a similar manner, when a phone receives a digital text message, photograph or video, a box appears around the transmitter's symbol indicating the transmitter of the message. The point to call network devices are network participants and each one has a PC/PDA device with the same software for use as a total participant network. Other situations for calling facilities that are not network participants are also described below.

Thus, a user is capable of initiating a cellular phone call by touch only and initiating conference calls by touching the geo-referenced map symbols. Furthermore, by using a similar symbol touching technique, a cellular phone can send user selected messages to cause a remote cellular phone to display and optionally announce emergency and other messages and to optionally elicit a response from the remote cellular phone.

All of the network participants have the same communication cell phone/PDA/GPS device described herein. The method and system include the ability of a specific user to provide polling in which other cellular phones, using SMS, internet or WiFi, report periodically based on criteria such as time, speed, distance traveled, or a combination of time, speed and distance traveled. A user can manually poll any or all other cell phone devices that are used by all of the participants in the communication network having the same devices. The receiving cellular phone application code responds to the polling command with the receiving cellular phone's location and status which could include battery level, GPS status, signal strength and entered track data. Optionally, the phone operators can set their phones to report automatically, based on time or distance traveled intervals or another criterion.

The soft switch application software causes a visual display of a matrix such as five across by six up (or another matrix) in which switch names are placed on the cellular/PDA display. The soft switch network application software knows the touch screen location of each of the switches in the matrix and the software routines that will be activated upon touching the switch.

The bottom row of soft switches displayed on the touch screen remains visually fixed. These switches concern the functions that are the most often used. One of the switches causes a matrix of other soft switches to appear above the visually fixed soft switches. These switches are function soft switches, the activation of any one of which causes a different matrix of soft switches to appear, which are known as the action soft switches. When the action soft switches appear, the function soft switch, which caused the action soft switches to appear, itself appears as a label in the lower left (or some other standard location) indicating to the operator the function soft switch that has been selected. When the operator selects an action soft switch, the appropriate application software to accomplish the action is activated.

Upon receiving a soft switch activation message, the ACS accesses the appropriate task execution software which accomplishes the required tasks including: entry of track data, entry of track amplification data, transmission of alpha/numeric messages, photographs, videos, display of messages to be read, selection of map types, placing voice calls, placing conference calls and 800 conference calls, presenting different potential operator selections, control of the display actions, polling network participants, establishing nets of participants (groups) so that communications with all in the group can be accomplished with a single soft switch action, and dropping a previously entered track. By providing a matrix and layers of soft switches which are easily manipulated by a stylus, each cell phone device in the communication network is extremely efficient in accessing and coordinating the appropriate application program for the device to perform.

Users such as emergency groups, police, fire personal, military, first responders and other groups need to be able to set up ad hoc digital and voice networks easily and rapidly. The users need to be able to rapidly coordinate activities eliminating the need for pre-entry data as discussed above. Users are required to enter the Servers' IP address and an ad hoc event name, a password and, for first responders and military, the names of their units. This will normally be controlled by the PDA/PC user's position in the chain of command. For others it can be any selected name and, if desired, password.

Figure 2:
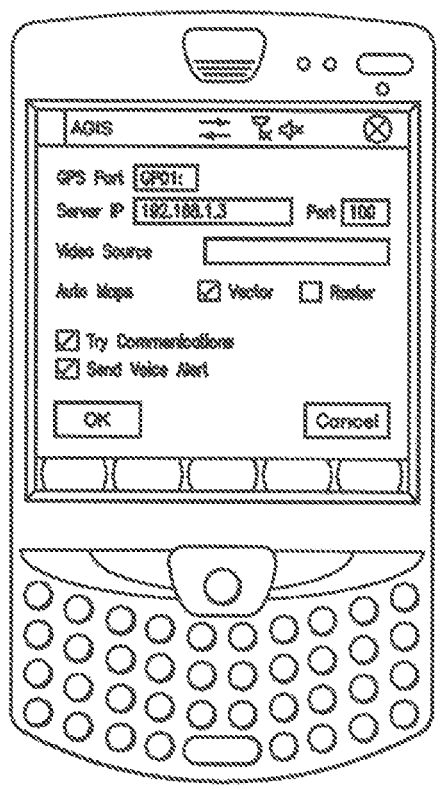
FIG. 2 shows the screen IP address entry menu.
Figure 3:
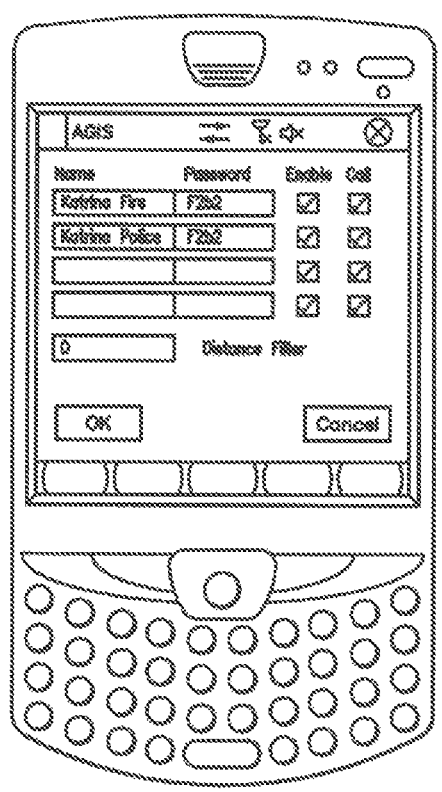
FIG. 3 shows ad hoc net names and password screen entry name.
Figure 4:
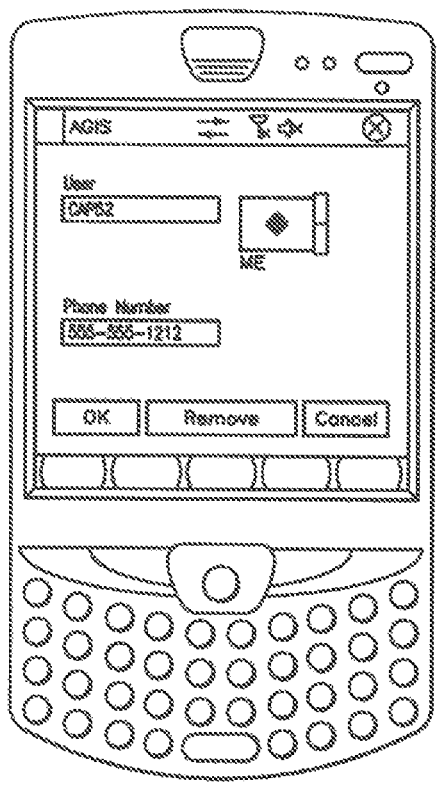
FIG. 4 shows a screen entry identifying user.

Referring now to FIG. 2, the PDA/PC screen displays an IP address entry menu. The user inserts the Server's IP address. Thus, as shown in FIG. 2, the user has entered in the cell phone/PDA the Server IP address and port number along with the GPS port listing and other information. Once that information is entered, referring now to FIG. 3, the user now enters the ad hoc event network name which is shown in this example as "Katrina" along with a password. Referring now to FIG. 4, the user then enters the user name or a unit name. FIG. 4 shows the entered user name and a phone number. The phone number may be automatically entered by the ACS or manually entered. The phone number is not required unless using the phone system (not VoIP) to make calls.

These are the initial user steps required to establish an ad hoc network or to join onto an existing ad hoc network.

Figure 5:
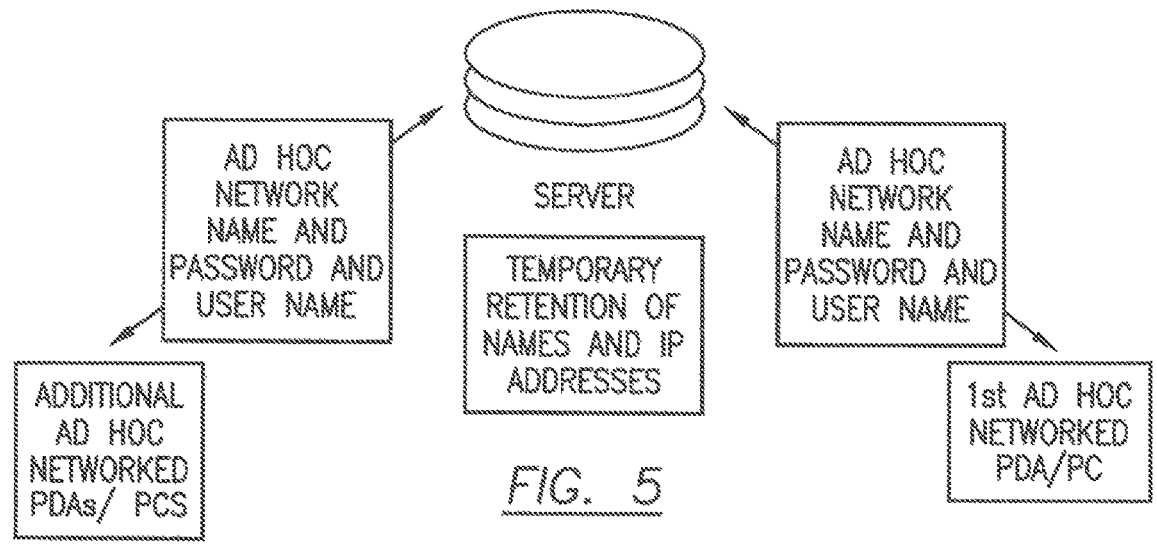
FIG. 5 shows a flow chart of the network as users sign on to the network.

Referring now to FIG. 5, these actions cause the user cell phone/PDA or PC to commence reporting to the Server. Upon receipt of the initial message from the user's PDA/PC, which may also contain additional data such as a license number, the Server stores the IP address of the user's PDA/PC unit and responds with a message notifying the user that he or she is connected to the Server. The PDA/PC then automatically commences to report its GPS derived location and other status information to the Server. Since there are no other devices initially communicating with the Server, the Server just retains the information. When other devices sign on to the Server with the same ad hoc event name and password, the Server's software recognizes this and stores their IP addresses. Since the Server has all parties' IP addresses, the server is able to pass location and status information automatically between the ad hoc network participants. This can occur even though the ad hoc network participants have not entered other network participants names, telephone numbers or Email addresses and do not have the other network participants' IP addresses, phone numbers or Email addresses. Once this connection is made, data types that are entered on one display that is of interest to all is sent from the server to all others in the network. Such data types include track location and track amplification data, geo-referenced white boards, and chat.

When the PDA/PC user wants to address particular data (a text message, photograph, video clip, voice recording, white board, or chat), the user enters the name of the other ad hoc network participant by either entering a name or touching his or her symbol. Since the Server knows the IP address of the name or symbol, the Server forwards the data appropriately to that network participant. When a unit signs off the network, it transmits a message to the Server which then transmits a message to all the network participants to drop the unit and its associated tracks. If a unit loses communications for a variable time period, the unit's data is flushed from each of the recipient network participants systems according to a variable time period. After a separate variable time period, the Server also flushes the non-reporting units data.

Figure 6:
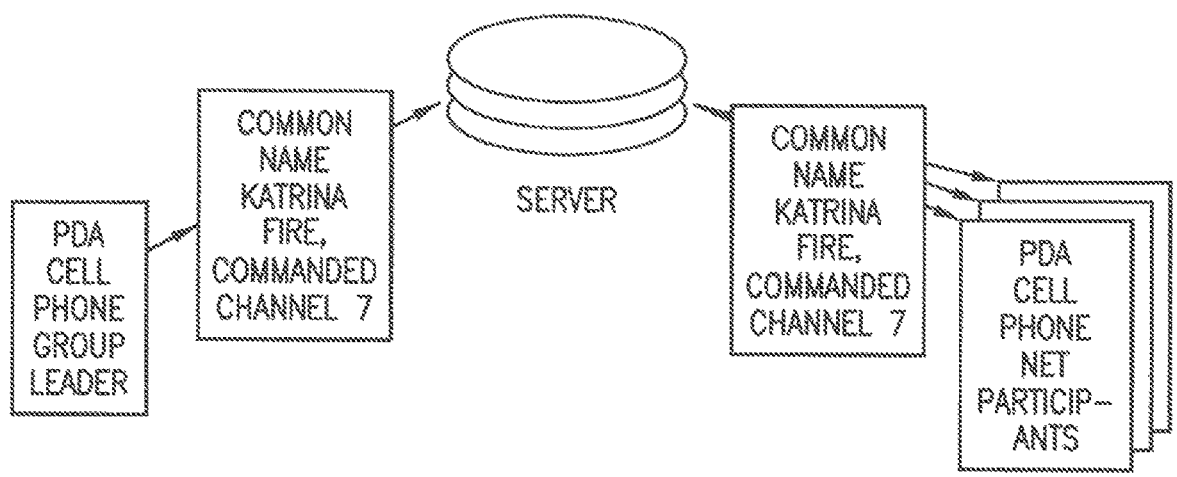
FIG. 6 shows a flow chart that depicts how a group commander can command networked PDAs/PCS and radios to load a Push To Talk (PTT) channel.

As can be seen in FIG. 6, provisions have been made for the PDA/PC to report on multiple networks thus allowing both digital communications up and down the chain of command and with adjacent units that have entered a common ad hoc network name and password.

Typically military and First Responder units use Push-to-Talk (PTT) communications. Units in an organization's chain of command typically have instituted a method to establish voice communications between themselves for they know each other's cellular phone numbers, PTT cellular group identifiers and radio frequencies or channel numbers. However, in a disaster there are many different units (fire, police, EMS, Military, and the like) involved all of whom need to establish voice communications between each other. The issue then becomes how to coordinate these PTT voice communications with the ad hoc digital communications so that all on the digital data network automatically also have PTT voice communications with each other. If the PCs and PDAs in a group have manually entered their phone numbers, or the ACS has automatically entered their phone numbers, and sent their phone numbers as part of their initial message to the Server, this data is then sent by the Server to all others in the network. Upon receiving the phone number data, the recipients' ACS loads the cell phones numbers into their databases creating a phone number PTT group common with the digital IP network group.

The issue when using radios, however, is different. PTT radio coordination between multiple people is achieved by using a common radio frequency "Channel".

Furthermore, it is desirable to enable it so that, when new network participants join the digital network, they are automatically included in the voice network and, when they leave the digital network, they are automatically dropped from the digital network.

Figure 7:
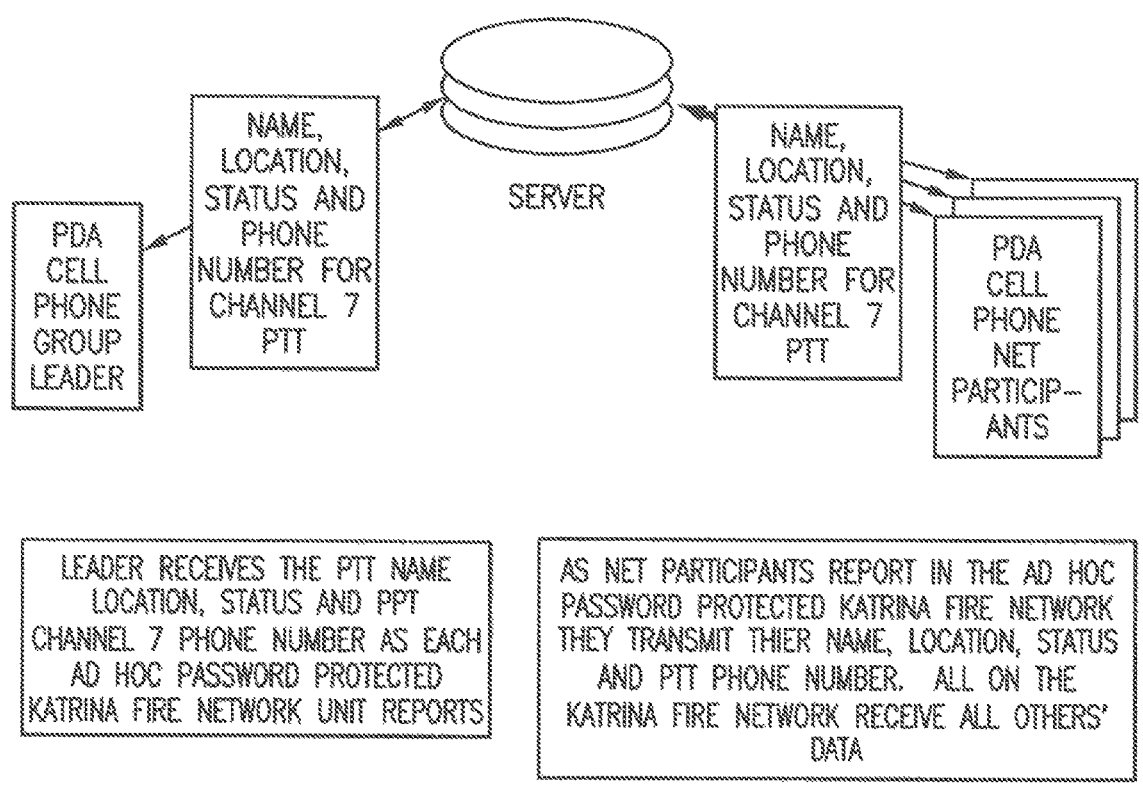
FIG. 7 shows a flow chart that depicts how networked radio units respond to receipt of the Push-to-Talk (PTT) Commanded Channel.

As can be seen in FIG. 6 and FIG. 7, a network participant currently can establish a new ad hoc digital network or join an existing ad hoc digital network by entering the ad hoc network name and password into his PDA/PC. To enable voice coordination with all that are a part of the ad hoc digital network, the user then enters (if user is authorized to do so) a Channel or Group number that the user is commanding all in the ad hoc network to establish as their PTT voice net. As seen in FIG. 6, the operator has commanded all to shift to Radio Channel or to a specific PTT cellular or radio channel; i.e. Group 7.

This action causes the PTT Channel, or PTT Group 7, to be sent to the other PDA/PC users in the ad hoc password protected network through the Server.

As shown in FIG. 6 and FIG. 7, the Group leader enters the Katrina Fire ad hoc network and issues a command which is sent to the Server to cause the PDAs/PCs that are in the Katrina Fire Group to automatically shift their Radio or cellular device to Channel 7. Each PDA cell phone can connect to the user's Radio for control with a USB cable, or WiFi, Bluetooth, or Near Field Communications (NFC) signals or other communications that are contained in the PDA/PC cellular device. This enables the Radios to shift to a common channel. This action is received by the Server which then sends the "Shift to Channel 7 Command" to all network participants in the Katrina Fire ad hoc network. When the PDA/PC/Tablet Katrina Fire network participant's software receives the command to shift its Radio Channel PPT to Group 7, this action causes the PDA's ACS to establish a new Channel 7 group (or to override an old Channel 7 group) that consists of all on the digital ad hoc network. The PC and PDAs then send their radios' digital interfaces messages to shift to Channel 7 or to the frequency associated with Channel 7. The digitally networked PC's and PDA's ACS devices then send a message to all on the digital network that they have shifted to Channel 7 (or to the appropriate frequency) and also further send the Group Leader's identifier and Command to shift to Channel 7 so that the ACS' devices associated with new users joining the digital network will automatically digitally set their radios to Channel 7 or the appropriate frequency.

As shown in FIG. 7, each time one of the network participants reports to the Katrina Fire network its Name, Position and Status, it now also reports that it is in PTT Channel 7 enabling the PTT group to grows in size until it encompasses all in the ad hoc password protected digital network. When units drop out of the Common Interest Network or lose communications because they are no longer active or they are out of range, their PTT Channel data is likewise dropped as they dropped out of the digital because their reports have not been received for a set, but adjustable, time period. If a unit rejoins the network, their PTT Name and Phone number is again automatically added to the Katrina Fire Interest Group as they are accepted by the Server into the Katrina Fire Interest digital Group.

When using the PTT feature, the ACS can enable the network participant to: 1. PTT with all that are in the ad hoc digital network, or 2. PTT with select specific network participants, by touching their symbol(s) and then selecting PTT soft switch or 3. Specify a group of the network participants by assigning their symbol or unit name to a list of network participants and then associating the list with a soft switch whose function is to enable the operator to have PTT communications with all in the list.

Since only one person is transmitting on a PTT voice network at any given time, the receiving network participant's ACS can relate the PTT IP address to the IP address of the unit transmitting his identification on the digital ad hoc network. This information can then be used by the other PTT networked participant's ACS to: 1. flash the transmitting unit's name on their PDA/PC screens or 2. if a photograph has been attached to the ad hoc digital network symbol of the PTT transmitting person, to flash that photograph on the receiving unit's PDA/PC display.

Figure 8:
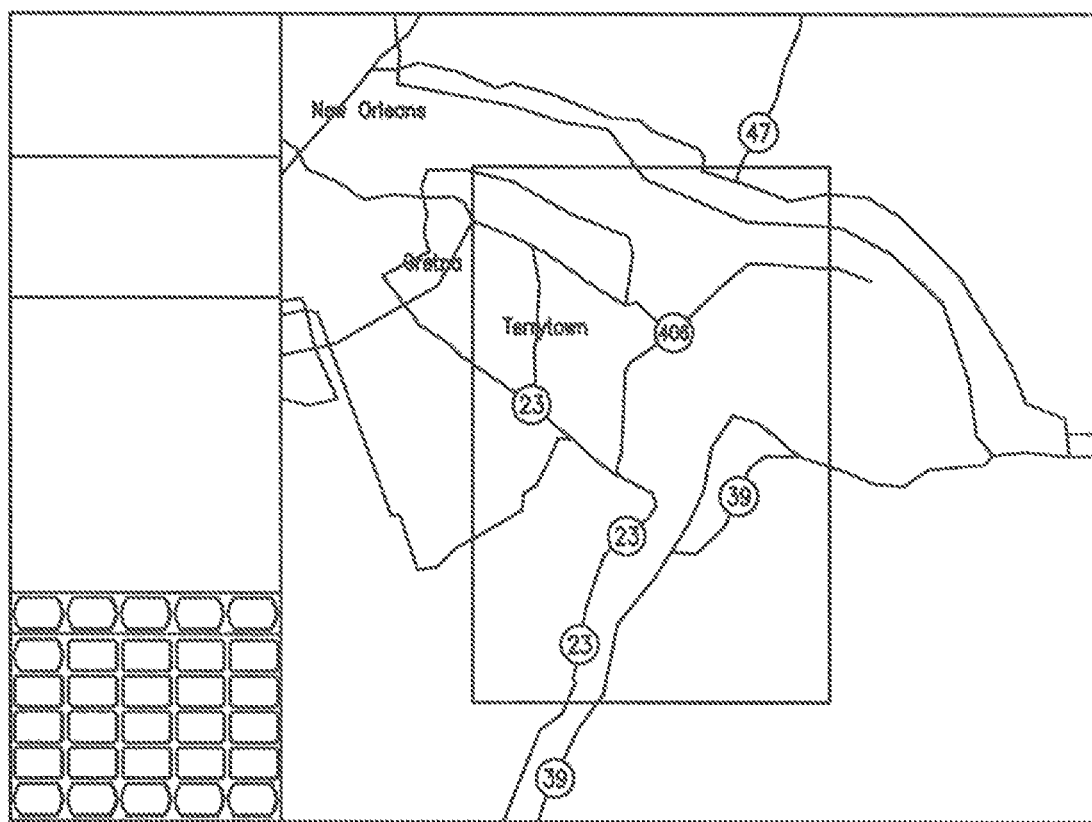
FIG. 8 shows a PDA screen geographical display that represents the area covered by the network.

Referring now to FIG. 8, for some Emergency events, and in particular military operations, it is desirable to further define ad hoc networks so that the networks encompass only a certain geographical area defined by boundary lines on a map. To accomplish this, an enhancement to the ad hoc digital and voice PTT password protected network is provided. As an example, once the Katrina Fire digital and PTT network is established, the ad hoc network can be further refined by the Group Leader defining a map area that limits the participating group to only those users within a geographically defined area by the Group Leader, creating on his PC/PDA display a box that defines a geographic area on a map.

As shown in FIG. 8, the Latitude/Longitude points that define the rectangle of the boundary area are sent from the Group Leader's device to the Server which relays the data to the other participating unit PC/PDA devices in the Katrina Fire network. When the participating unit devices receive the Latitude/Longitude points, their software computes whether their PC/PDA unit is inside or outside a boundary area. If the users are inside the defined area, the users retain but disregard the Latitude/Longitude data and continue to report on the digital password protected network and to use the commanded PTT channel/frequency. However, if the users are outside the area, the users send a "drop me message" to the Katrina Fire PDA/PC digital network Server and cease reporting on the network. When Katrina Fire network PDA/PC user units leave the defined area or lose communications for a specified, but adjustable, time period, the Server drops the unit from the network and informs all network users that the unit is dropped from the digital network and from voice PTT Channel 7 which causes all others on the network to drop them. When Katrina Fire networked PDA/PC user units re-enter the area, the unit's ACS detects the fact and commences reporting as it receives reports from other network participants it will receive the current PTT channel or frequency.

In disasters, battery life is essential as there may not be extra batteries available or a power available to recharge the battery. It is therefore essential to lessen battery utilization. The normal method by which this is accomplished is to not use software that keeps the display on, uses the GPS or transmits on the communications. However, deactivating any one of these processes produces a problem with providing location data to all on the network.

With location sharing there are essentially two times when the location information is essential: a) Where the user wants all to know his/her location and status and the location and status of others and b) When the commander wants to know the location and status of all or of a particular unit.

When the user wants others to know the user location and status, the user can simply turn on location reporting software which then turns on the display, the GPS and the communications reporting software causing the reporting of the user location to the ad hoc password protected digital network. However, when the commander or someone else wants to know the location and status of the PDA/PC unit that is conserving battery usage by having user display, GPS and communications transmission turned on, the commander has no method to accomplish this.

This problem is overcome by enabling the commander to transmit a "turn on" IP message to the battery conserving(s) unit(s) by addressing the message to the ad hoc network Server which then sends an SMS message to the addressed phone. The SMS message will be received as long as the phone is powered on, as SMS is integrated with the cell phone's voice communications. The Server could also send a turn on IP message to networked radios, which will then cause the radio's computer to send a digital message to the receiving PC/PDA to activate the user display and location and status reporting software.

Figure 9:
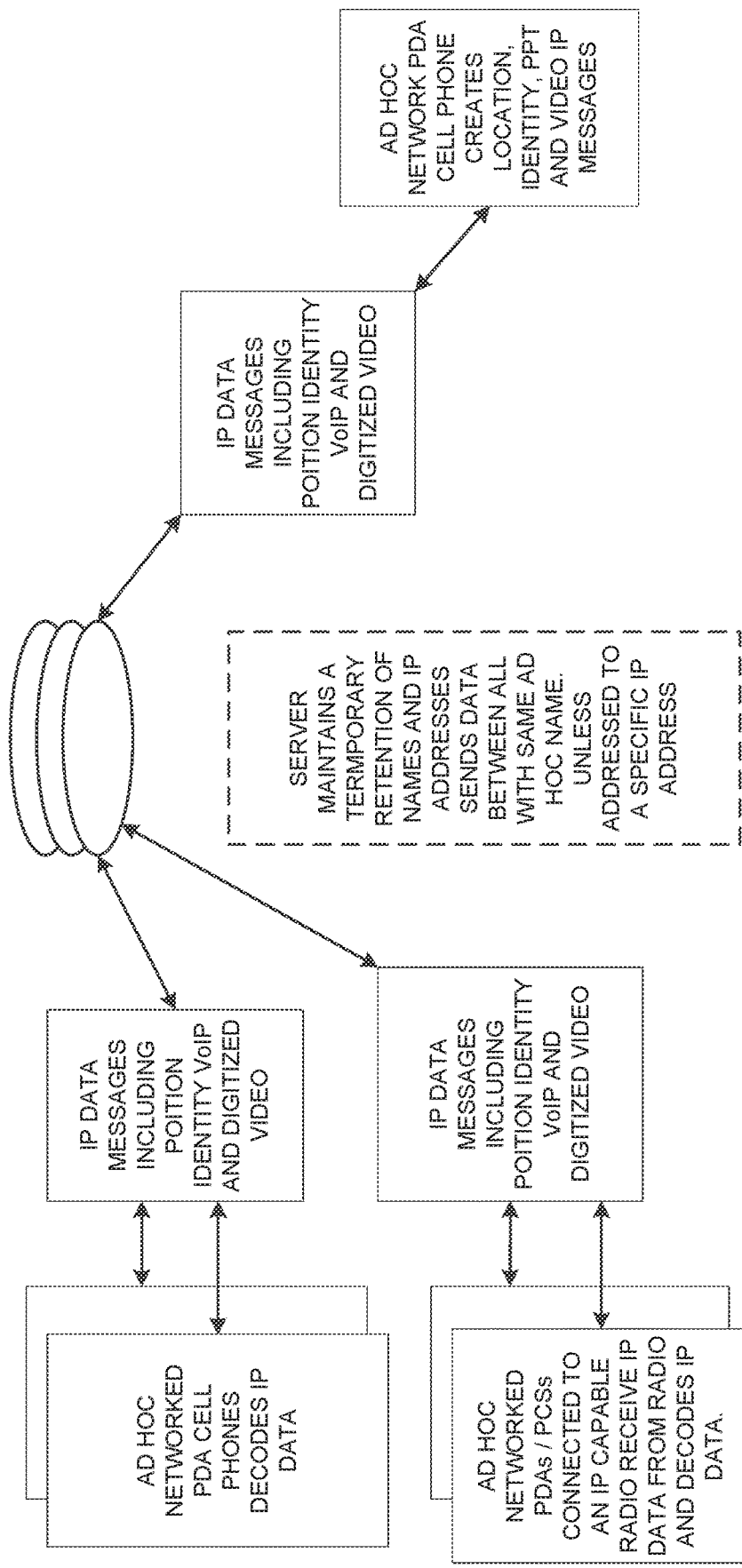
FIG. 9 shows a diagram that enables determining location, status, ViOP, PTT, and video communication between radios and cell phones.

Referring now to FIG. 9, the diagram illustrates the enabling of location, status, VoIP, PTT, and video communications between radios and cell phones. The server maintains a temporary retention of names and IP addresses and sends data between all with the same ad hoc name unless addressed to a specific IP address. This requires that there is a radio with digital capabilities attached to the server shown in FIGS. 5, 6, and 7. These radios are set so that they each have a unique IP address. All of the participants have either PDA cell phones or PDAs without cellular. Those that also have PDAs without cellular (or choose not to use cellular) are connected to their radios via a USB cable or Wi-Fi, Bluetooth, or near field communications (NFC) that is part of the PDA/PC OR PDA cell phone. This is illustrated in FIG. 9.

Figure 10:
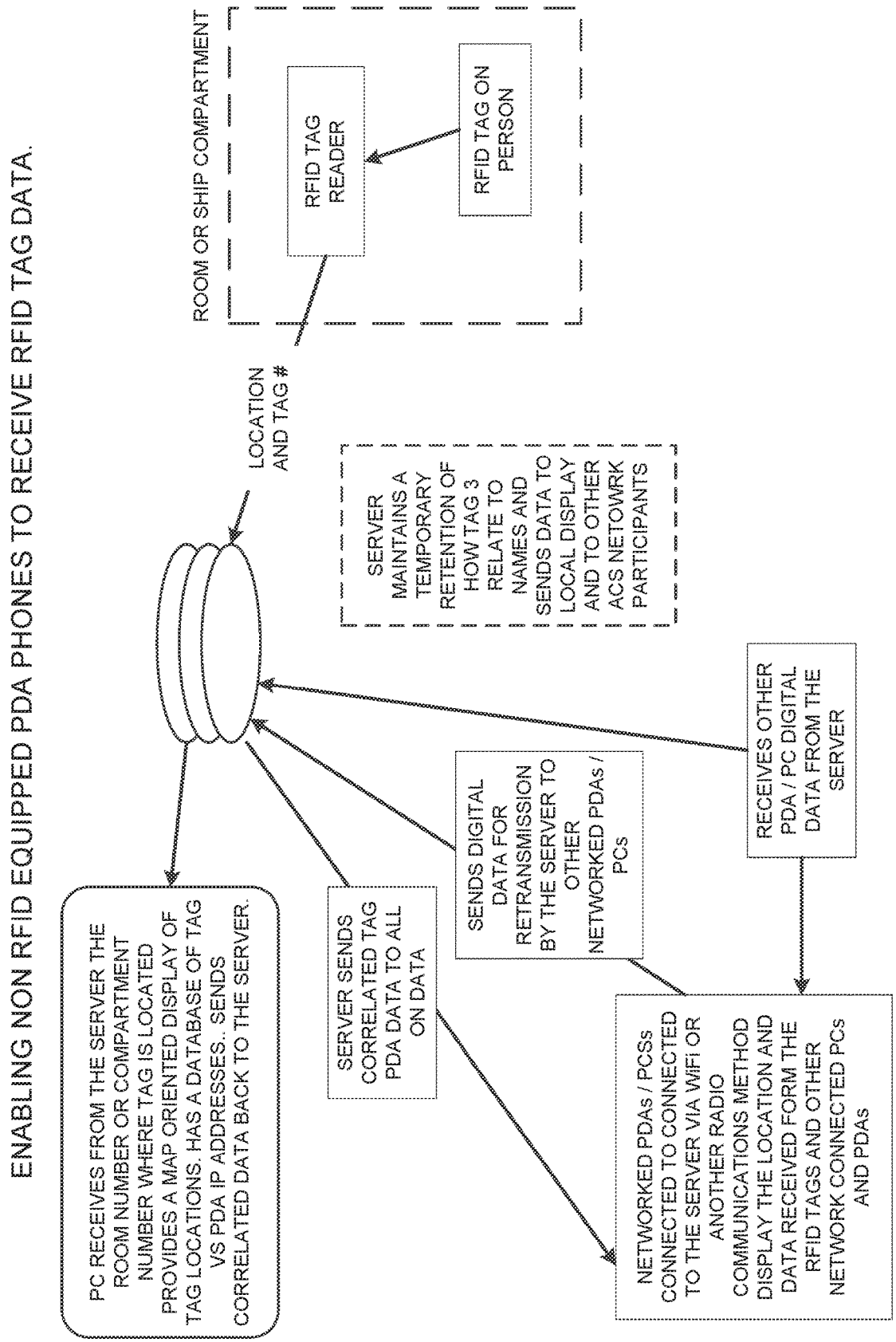
FIG. 10 shows a diagram that describes enabling non RFID equipped PDA phones to receive RFID tag data.

Referring now to FIG. 10 the diagram shows enabling non-RFID equipped PDA phones to receive RFID tag data. The server maintains a temporary retention of how Tags relate to names and sends data to local display and to other ACS network participants. Currently RFID tags are used for many functions, one of which is to track personnel inside a building to the room or compartment in which they are located. This is accomplished by RFID readers that are in each of the rooms. When personnel with an RFID tag get within a particular distance or range of the RFID reader, the reader detects their presence and sends it to a central site server via a USB cable or Wi-Fi. The PC connected to the server displays the personnel room locations. With the invention described herein, the server would then send the location to the ACS PDA/PC phones that would be carried by individuals located throughout the building or ship. The PDA/PC phones would display the room or ships compartments and the location of individuals with RFID tags and simultaneously enable PTT, chat, messaging, whiteboards, commands geo-fence penetration alerts or other types of messages between each of the PDA cell phones. The RFID tag would provide room location data of all to all that are on the ACS Wi-Fi network without their PDA cell phone having an RFID Reader attached to it. The operation is explained in detail in FIG. 10.

The instant invention has been shown and described herein in what is considered to be the most practical and preferred embodiment. It is recognized, however, that departures may be made there from within the scope of the invention and that obvious modifications will occur to a person skilled in the art.

What is claimed is:

1. A mobile device operable to provide a particular participant in a cellular communication network with access to one or more other participants in the cellular communication network, each participant having a mobile device operable to send and receive voice communication, text messages, photographs and video, each mobile device including a CPU and memory, a GPS navigation system, and a touch screen display, the mobile device of the particular participant comprising:
   a CPU and memory;
   a GPS navigation system; and
   a touch screen display,
   wherein the particular participant's mobile device is operable to perform actions comprising:
   displaying a map of a geographic area on the touch screen display of the particular participant's mobile device;
   displaying one or more participant symbols on the touch screen display of the particular participant's mobile device, each of the participant symbols representing a respective other participant, wherein the participant symbols are arranged on the map, and wherein a respective position of each participant symbol on the map indicates a respective location of the other participant represented by the participant symbol;
   displaying one or more fixed site symbols on the map corresponding to one or more respective fixed sites and associated with respective contact information, wherein each of the fixed site symbols is user-selectable to obtain the contact information associated with the fixed site corresponding to the respective fixed site symbol;
   identifying a first user interaction with the particular participant's mobile device indicating entry of a new entity of interest at a user-specified position on the map;
   based on the first user interaction,
   displaying an entity symbol representing the new entity of interest at the user-specified position on the map,
   determining coordinates of a geographical location of the new entity of interest based on coordinates of the user-specified position on the map, and
   transmitting the geographical location of the new entity of interest to the mobile devices of the other participants for addition of the entity symbol to respective touch screen displays of the other participants' mobile devices at respective positions on respective maps corresponding to the geographical location of the new entity of interest; and
   identifying a second user interaction with the touch screen display of the particular participant's mobile device indicating at least selection of one of the participant symbols and, based thereon, accessing contact information relating to the selected participant symbol and automatically initiating communication with the mobile device of the other participant represented by the selected participant symbol.

2. The mobile device of claim 1, wherein the actions further comprise:
   displaying a set of one or more selectable control components on the touch screen display of the particular participant's mobile device, wherein each of the control components in the set corresponds to a respective function that the participant's mobile device is configured to perform based on selection of the respective control component.

3. The mobile device of claim 2, wherein the set of control components is a first set, wherein the control components in the first set include a first control component, and wherein the function corresponding to the first control component comprises:
   displaying a second set of one or more selectable control components on the touch screen display of the particular participant's mobile device.

4. The mobile device of claim 3, wherein the displayed second set of control components replaces the first set of control components on the touch screen display of the particular participant's mobile device.

5. The mobile device of claim 3, wherein the identified second user interaction with the touch screen display of the particular participant's mobile device further indicates selection of a particular control component displayed on the touch screen display.

6. The mobile device of claim 5, wherein the particular control component is included in the second set of control components, and wherein initiating the communication with the mobile device of the other participant comprises transmitting data to the mobile device of the other participant.

7. The mobile device of claim 3, wherein the actions further comprise:
   identifying a third user interaction with the touch screen display of the particular participant's mobile device indicating at least selection of one of the fixed site symbols; and
   based on the third user interaction, accessing contact information associated with the selected fixed site symbol and automatically initiating communication with the fixed site represented by the selected fixed site symbol.

8. The mobile device of claim 7, wherein the identified third user interaction with the touch screen display of the particular participant's mobile device further indicates selection of a particular control component displayed on the touch screen display, and wherein the particular control component is included in the second set of control components.

9. The mobile device of claim 3, wherein the actions further comprise:
   receiving a request to join the communication network, wherein the request is sent by the mobile device of one of the other participants in the communication network; and
   based on acceptance of the request, joining the communication network, wherein joining the network comprises granting authorization for the mobile devices of the other participants to repeatedly perform a plurality of remote control operations on the particular participant's mobile device.

10. The mobile device of claim 9, wherein the actions further comprise:
    subsequent to joining the communication network, receiving first and second messages indicating first and second remote control operations, wherein each of the first and second messages is sent by the mobile device of a respective other participant; and
    performing the first and second remote control operations indicated by the first and second messages based on the authorization granted when the particular participant's mobile device joined the communication network.

11. The mobile device of claim 10, wherein the first remote control operation comprises at least one of playing audio, initiating a phone call, vibrating, converting text to speech, executing software, changing sound intensity, or displaying information.

12. The mobile device of claim 9, wherein joining the communication network further comprises obtaining authorization for the particular participant's mobile device to repeatedly perform the plurality of remote control operations on the mobile devices of the other participants.

13. The mobile device of claim 12, wherein the actions further comprise:
   initiating performance of a remote control operation by the mobile device of a selected one of the other participants by sending a message to the mobile device of the selected other participant, wherein the message indicates the remote control operation to be performed.

14. The mobile device of claim 13, wherein the actions further comprise:
   identifying a third user interaction with the touch screen display of the particular participant's mobile device indicating at least selection of the participant symbol corresponding to the selected other participant and selection of a particular control component displayed on the touch screen display, wherein the particular control component is included in the second set of control components, wherein the message indicating the remote control operation to be performed is sent based on the identifying of the third user interaction.

15. The mobile device of claim 3, wherein the actions further comprise:
   polling a selected one of the other participants for location information of the selected other participant, wherein the polling comprises sending a request for the location information to the mobile device of the selected other participant.

16. The mobile device of claim 15, wherein the actions further comprise:
   identifying a third user interaction with the touch screen display of the particular participant's mobile device indicating at least selection of the participant symbol corresponding to the selected other participant and selection of a particular control component displayed on the touch screen display,
   wherein the particular control component is included in the second set of control components, and
   wherein the request for the location information is sent based on the identifying of the third user interaction.

17. The mobile device of claim 3, wherein the new entity of interest is an entity other than the particular participant, the other participants, and the fixed sites.

18. The mobile device of claim 17, wherein the first user interaction further specifies information associated with the new entity of interest.

19. The mobile device of claim 18, wherein the information associated with the new entity of interest includes categorical information associated with the new entity of interest.

20. The mobile device of claim 18, wherein the first user interaction comprises selection of a particular control component displayed on the touch screen display, the selection of the particular control component specifying the information associated with the new entity of interest.

21. The mobile device of claim 20, wherein the particular control component is included in the second set of control components.

22. The mobile device of claim 18, wherein the actions further comprise:
   transmitting the user-specified information associated with the new entity of interest to the mobile devices of the other participants.

23. The mobile device of claim 3, wherein the new entity of interest is a first new entity of interest, and wherein the actions further comprise:
   receiving entity information transmitted by a mobile device of a particular other participant, the entity information including a user-indicated location of a second new entity of interest other than the particular participant, the other participants, and the fixed sites; and
   based on the receiving of the entity information, automatically adding an entity symbol to the touch screen display at a position on the map corresponding to the user-indicated location of the second new entity of interest.

24. The mobile device of claim 23, wherein the user-indicated information further comprises information associated with the second new entity of interest, and wherein the actions further comprise:
   identifying a third user interaction with the touch screen display of the particular participant's mobile device indicating at least selection of the entity symbol corresponding to the second new entity of interest and, based thereon, displaying the information associated with the second new entity of interest.

25. The mobile device of claim 3, wherein the map is a first map, and wherein the actions further comprise:
   identifying a third user interaction with the touch screen display of the particular participant's mobile device indicating at least selection of a particular control component displayed on the touch screen display; and
   based thereon, displaying a second map different from the first map on the touch screen display of the particular participant's mobile device.

26. The mobile device of claim 1, wherein the actions further comprise transmitting location data indicating a location of the particular participant's mobile device to the other participants in the communication network.

27. The mobile device of claim 3, wherein the actions further comprise sending an emergency message to the mobile devices of all the other participants in the communication network, wherein each of the mobile devices of the other participants is configured to activate a program based on receipt of the emergency message.

28. The mobile device of claim 27, wherein the actions further comprise:
   identifying a third user interaction with the touch screen display of the particular participant's mobile device indicating at least selection of a particular control component displayed on the touch screen display,
   wherein the particular control component is included in the second set of control components, and
   wherein the emergency message is sent based on the identifying of the third user interaction.

29. The mobile device of claim 3, wherein the actions further comprise:
   receiving an emergency message sent by the mobile device of a respective other participant in the communication network; and
   based on receipt of the emergency message, performing at least one of making an audio announcement, announcing an emergency, vibrating, changing sound intensity, playing a recorded audio file, displaying data, displaying an image, displaying a video, placing a phone call to the mobile device of the respective other participant, or placing a phone call to another mobile device.

30. A method for providing a particular participant in a cellular communication network with access to one or more other participants in the cellular communication network, each participant having a mobile device operable to send and receive voice communication, text messages, photographs and video, each mobile device including a CPU and memory, a GPS navigation system, and a touch screen display, the method comprising:
- performing, by the mobile device of the particular participant:
- displaying a map of a geographic area on the touch screen display of the particular participant's mobile device;
- displaying one or more participant symbols on the touch screen display of the particular participant's mobile device, each of the participant symbols representing a respective other participant, wherein the participant symbols are arranged on the map, and wherein a respective position of each participant symbol on the map indicates a respective location of the other participant represented by the participant symbol;
- displaying one or more fixed site symbols on the map corresponding to one or more respective fixed sites and associated with respective contact information, wherein each of the fixed site symbols is user-selectable to obtain the contact information associated with the fixed site corresponding to the respective fixed site symbol;
- identifying a first user interaction with the particular participant's mobile device indicating entry of a new entity of interest at a user-specified position on the map;
- based on the first user interaction,
- displaying an entity symbol representing the new entity of interest at the user-specified position on the map,
- determining coordinates of a geographical location of the new entity of interest based on coordinates of the user-specified position on the map, and
- transmitting the geographical location of the new entity of interest to the mobile devices of the other participants for addition of the entity symbol to respective touch screen displays of the other participants' mobile devices at respective positions on respective maps corresponding to the geographical location of the new entity of interest; and
- identifying a second user interaction with the touch screen display of the particular participant's mobile device indicating at least selection of one of the participant symbols and, based thereon, accessing contact information relating to the selected participant symbol and automatically initiating communication with the mobile device of the other participant represented by the selected participant symbol.

31. The mobile device of claim 6, wherein the data comprise a text message, an image, or a video.

32. The mobile device of claim 2, wherein the actions further comprise:
- identifying a third user interaction with the touch screen display of the particular participant's mobile device indicating at least selection of one of the control components and, based thereon, causing at least one operation to be performed on the map,
- wherein the at least one operation is selected from the group consisting of: a zoom-in operation, a zoom-out operation, a grabbing operation, a panning operation, and a centering operation.

33. The mobile device of claim 26, wherein:
- the location data are updated location data indicating an updated location of the particular participant's mobile device, and
- the updated location data are transmitted based on passage of a predetermined time interval since transmitting previous location information comprising a previous location of the particular participant's mobile device, displacement of the particular participant's mobile device by a predetermined distance relative to a previous location of the particular participant's mobile device, or both.

34. The mobile device of claim 1, wherein the actions further comprise:
- sending a message to the mobile device of a particular one of the other participants, wherein the mobile device of the particular other participant is configured to place a return phone call to the particular participant's mobile device based on receipt of the message.

35. The mobile device of claim 2, wherein the actions further comprise:
- identifying a third user interaction with the touch screen display of the particular participant's mobile device indicating at least selection of a particular control component displayed on the touch screen display; and
- based thereon, automatically initiating communication with the mobile devices of a first subset of the other participants, wherein the first subset of the other participants includes one or more first participants selected from a list of the one or more other participants.

36. The mobile device of claim 6, wherein the data are transmitted to the mobile device of the other participant via the cellular communication network.

37. The mobile device of claim 1, wherein the new entity of interest is a vehicle, a person, a facility, a building, or an event.

38. The method of claim 30, further comprising performing, by the mobile device of the particular participant:
- displaying a first set of one or more selectable control components on the touch screen display of the particular participant's mobile device, wherein each of the control components in the set corresponds to a respective function that the participant's mobile device is configured to perform based on selection of the respective control component, wherein the control components in the first set include a first control component, and wherein the function corresponding to the first control component includes displaying a second set of one or more selectable control components on the touch screen display of the particular participant's mobile device.

39. The method of claim 38, further comprising performing, by the mobile device of the particular participant:
- receiving a request to join the communication network, wherein the request is sent by the mobile device of one of the other participants in the communication network; and
- based on acceptance of the request, joining the communication network, wherein joining the network comprises granting authorization for the mobile devices of the other participants to repeatedly perform a plurality of remote control operations on the particular participant's mobile device.

40. The method of claim 39, wherein joining the communication network further comprises obtaining authorization for the particular participant's mobile device to repeatedly perform the plurality of remote control operations on the mobile devices of the other participants, and wherein the method further comprises performing, by the mobile device of the particular participant:
- identifying a third user interaction with the touch screen display of the particular participant's mobile device indicating at least selection of the participant symbol corresponding to the selected other participant and selection of a particular control component displayed on the touch screen display, wherein the particular control component is included in the second set of control components; and based on the identifying of the third user interaction, initiating performance of a remote control operation by the mobile device of the selected other participant by sending a message to the mobile device of the selected other participant, wherein the message indicates the remote control operation to be performed.

41. The method of claim 30, wherein the new entity of interest is an entity other than the particular participant, the other participants, and the fixed sites, wherein the first user interaction further specifies information associated with the new entity of interest, and wherein the method further comprises performing, by the mobile device of the particular participant:

transmitting the user-specified information associated with the new entity of interest to the mobile devices of the other participants.

42. The method of claim 30, wherein the new entity of interest is a first new entity of interest, and wherein the method further comprises performing, by the mobile device of the particular participant:

receiving entity information transmitted by a mobile device of a particular other participant, the entity information including a user-indicated location of a second new entity of interest other than the particular participant, the other participants, and the fixed sites; and based on the receiving of the entity information, automatically adding an entity symbol to the touch screen display at a position on the map corresponding to the user-indicated location of the second new entity of interest.

43. The method of claim 42, wherein the entity information further comprises information associated with the second new entity of interest, and wherein the method further comprises performing, by the mobile device of the particular participant:

identifying a third user interaction with the touch screen display of the particular participant's mobile device indicating at least selection of the entity symbol corresponding to the second new entity of interest and, based thereon, displaying the information associated with the second new entity of interest.

44. The method of claim 30, wherein the new entity of interest is a vehicle, a person, a facility, a building, or an event.

45. The method of claim 30, further comprising performing, by the mobile device of the particular participant:

transmitting location data indicating a location of the particular participant's mobile device to the other participants in the cellular communication network via the cellular communication network.

* * * * *